US012671271B2

(12) United States Patent　　(10) Patent No.:　US 12,671,271 B2

Gu et al.　　(45) Date of Patent:　Jun. 30, 2026

(54) MAGNETIC SUBSTANCE DISPLACEMENT CONTROL MODULE AND ELECTRONIC DEVICE COMPRISING SAME

(71) Applicant: SAMSUNG ELECTRONICS CO., LTD., Suwon-si (KR)

(72) Inventors: Beomwoo Gu, Suwon-si (KR); Joonhong Kim, Suwon-si (KR); Jaehyun Park, Suwon-si (KR); Jaeseok Park, Suwon-si (KR); Kangho Byun, Suwon-si (KR); Sungku Yeo, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 19/034,229

(22) Filed: Jan. 22, 2025

(65) Prior Publication Data

US 2025/0167596 A1　　May 22, 2025

Related U.S. Application Data

(63) Continuation of application No. PCT/KR2023/010290, filed on Jul. 18, 2023.

(30) Foreign Application Priority Data

Jul. 22, 2022　(KR) ........................ 10-2022-0091364

(51) Int. Cl.
*H02J 50/12*　　(2016.01)
*H02J 50/00*　　(2016.01)

(52) U.S. Cl.
CPC ............ *H02J 50/12* (2016.02); *H02J 50/005* (2020.01)

(58) Field of Classification Search
CPC ................................ H02J 50/12; H02J 50/005
See application file for complete search history.

(56) References Cited

U.S. PATENT DOCUMENTS

| | | |
|---|---|---|
| 2014/0265614 A1 | 9/2014 | Kim et al. |
| 2016/0254701 A1 | 9/2016 | Tsuda et al. |
| | (Continued) | |

FOREIGN PATENT DOCUMENTS

| | | |
|---|---|---|
| EP | 4191826 A1 | 6/2023 |
| JP | 2019-9298 A | 1/2019 |
| | (Continued) | |

OTHER PUBLICATIONS

International Search Report (PCT/ISA/210) issued by the International Searching Authority on Oct. 24, 2023 in corresponding International Application No. PCT/KR2023/010290.

(Continued)

*Primary Examiner* — Robert L Deberadinis
(74) *Attorney, Agent, or Firm* — Sughrue Mion, PLLC

(57) ABSTRACT

A wireless power transmission device may include a resonator comprising at least one coil and at least one capacitor, a magnetic substance displacement control module including a first magnetic substance portion and a second magnetic substance portion, a modulator configured to adjust a gap between the first magnetic substance portion and the second magnetic substance portion, and a driver configured to drive the modulator. The first magnetic substance portion and the second magnetic substance portion of the magnetic substance displacement control module are disposed to surround at least a portion of the at least one coil.

20 Claims, 17 Drawing Sheets

(56) References Cited

U.S. PATENT DOCUMENTS

| | | |
|---|---|---|
| 2016/0359337 A1 | 12/2016 | Von Novak, III et al. |
| 2017/0133134 A1 | 5/2017 | Pohl et al. |
| 2018/0156881 A1 | 6/2018 | Poole et al. |
| 2019/0018095 A1 | 1/2019 | Mileski et al. |
| 2019/0227137 A1 | 7/2019 | Mileski et al. |
| 2020/0168437 A1 | 5/2020 | Ziemba et al. |

FOREIGN PATENT DOCUMENTS

| | | |
|---|---|---|
| KR | 10-2012-0049017 A | 5/2012 |
| KR | 10-2014-0114487 A | 9/2014 |
| KR | 10-2017-0008713 A | 1/2017 |
| KR | 10-2017-0075608 A | 7/2017 |
| KR | 20-2017-003581 U | 10/2017 |
| KR | 10-2018-0042576 A | 4/2018 |
| KR | 10-2021-0119250 A | 10/2021 |
| KR | 10-2022-0015251 A | 2/2022 |

OTHER PUBLICATIONS

Written Opinion (PCT/ISA/237) issued by the International Searching Authority on Oct. 24, 2023 in corresponding International Application No. PCT/KR2023/010290.

200'

MAGNETIC SUBSTANCE DISPLACEMENT CONTROL MODULE AND ELECTRONIC DEVICE COMPRISING SAME

CROSS-REFERENCE TO RELATED APPLICATION

This application is a continuation application of International Patent Application No. PCT/KR2023/010290, filed on Jul. 18, 2023, which is based on and claims the benefit of a Korean patent application number 10-2022-0091364, filed on Jul. 22, 2022, in the Korean Intellectual Property Office, the disclosure of which is incorporated herein by reference in its entirety.

BACKGROUND

Apparatuses and methods consistent with example embodiments relate to a wireless power charging system that involves controlling the displacement of a magnetic substance.

Wireless charging technology enables wireless power transmission and reception without the need for physical connectors. For example, wireless charging may automatically charge the battery of a mobile phone by simply placing the mobile phone on a wireless power transmission device (e.g., a charging pad) without connection via a separate charging connector. Wireless communication technology eliminates the need for a connector for supplying power to electronics, thus offering benefits such as enhanced waterproofing and improved portability due to the absence of a wired charger.

Recently, as wireless charging technology develops, research is focused on methods for charging various electronic devices (wireless power receivers) by supplying power through an electronic device (resonator). Wireless charging comes in a few different types, such as of electromagnetic induction using a coil, resonance, and radio frequency (RF)/microwave radiation that converts electrical energy into electromagnetic waves and transfers the microwaves.

For example, wireless charging techniques using electromagnetic induction or resonance are increasingly used for electronic devices, such as smartphones. If a resonator (e.g., a power transmitting unit (PTU)) and a wireless power receiver (e.g., power receiving unit (PRU) such as a smartphone or a wearable electronic device) come in contact or close to each other within a predetermined distance, the battery of the wireless power receiver may be charged by electromagnetic induction or electromagnetic resonance between the transmission coil of the resonator and the reception coil of the wireless power receiver.

Power transmission via electromagnetic induction is a method that uses magnetic induction between a primary coil and a secondary coil to transmit power. If an AC current flows through the primary coil, a time-varying magnetic field is generated around the primary coil. This magnetic field induces an electromotive force in the secondary coil of the reception end, so that power is delivered. Due to its excellent transmission efficiency, electromagnetic induction currently takes a position as main wireless charging technology.

Electromagnetic induction is widely used and has applications in various devices. The contactless charging technology applied to electric toothbrushes, razors, and smart devices adopts an electromagnetic induction scheme. However, electromagnetic induction-based wireless charging technology may experience reduced charging efficiency if the electronic device is not positioned correctly on the wireless power transmission device or is not placed in a specific direction for charging. Since the wireless charging technology using the electromagnetic induction scheme requires a short distance between the first coil and the second coil for power transmission and reception, the distance between the electronic device and the wireless power transmission device may need to be kept minimal.

SUMMARY

According to an aspect of the disclosure, a wireless power transmission device may include: a resonator comprising at least one coil and at least one capacitor, a magnetic substance displacement control module including: a first magnetic substance portion and a second magnetic substance portion; a modulator configured to adjust a gap between the first magnetic substance portion and the second magnetic substance portion; and a driver configured to drive the modulator. The first magnetic substance portion and the second magnetic substance portion of the magnetic substance displacement control module are disposed to surround at least a portion of the at least one coil.

According to another aspect of the disclosure, a magnetic substance displacement control module may include: a first magnetic substance portion; a second magnetic substance portion that is physically separated from and configured to be coupled to the first magnetic substance portion; a modulator configured to adjust a gap between the first magnetic substance portion and the second magnetic substance portion; and a driver configured to drive the modulator.

According to another aspect of the disclosure, a wireless charger may include: a resonator comprising at least one coil and at least one capacitor; a first magnetic substance portion positioned at a fixed location; a second magnetic substance portion physically separated from the first magnetic substance portion and configured to move laterally toward or away from the first magnetic substance portion; a driver configured to cause the second magnetic substance portion to move relative to the first magnetic substance portion; and a processor configured to control the driver to adjust a gap between the first magnetic substance portion and the second magnetic substance portion based on a measured inductance of the resonator.

BRIEF DESCRIPTION OF THE DRAWINGS

The above and/or other aspects will be more apparent by describing certain example embodiments, with reference to the accompanying drawings, in which.

DETAILED DESCRIPTION

Figure 1A:
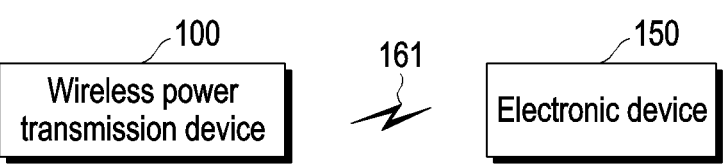
FIG. 1A is a block diagram illustrating a wireless power transmission device and an electronic device according to an embodiment.

Example embodiments are described in greater detail below with reference to the accompanying drawings.

In the following description, like drawing reference numerals are used for like elements, even in different drawings. The matters defined in the description, such as detailed construction and elements, are provided to assist in a comprehensive understanding of the example embodiments. However, it is apparent that the example embodiments can be practiced without those specifically defined matters. Also, well-known functions or constructions are not described in detail since they would obscure the description with unnecessary detail.

Figure 1B:
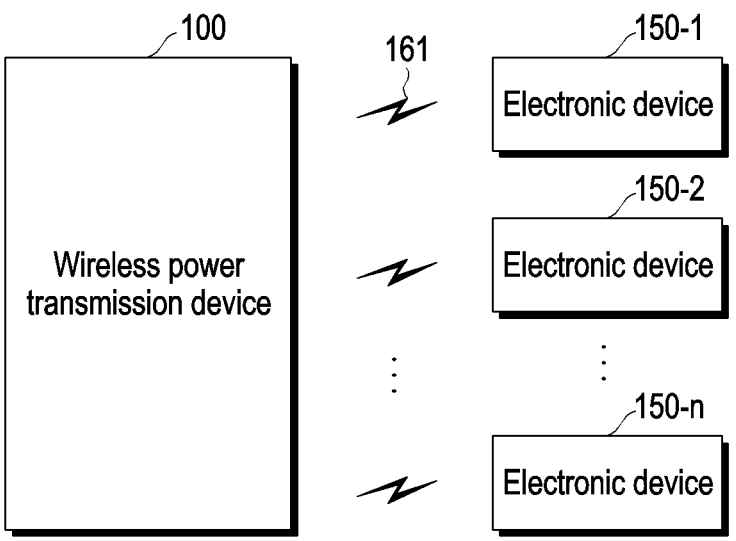
FIG. 1B illustrates a wireless power transmission device and a plurality of electronic devices according to an embodiment.

FIG. 1A is a block diagram illustrating a wireless power transmission device and an electronic device according to an embodiment. FIG. 1B illustrates a wireless power transmission device and a plurality of electronic devices according to an embodiment.

Referring to FIG. 1A, a wireless power transmission device 100 according to an embodiment may wirelessly transmit power 161 to a wireless power reception device 150 (hereinafter, referred to as an 'electronic device 150'). The wireless power transmission device 100 may transmit the power 161 to the electronic device 150 according to various charging schemes. For example, the wireless power transmission device 100 may transmit power 161 as per an induction scheme. Adopting the induction scheme, the wireless power transmission device 100 may include, for example, a power source, a direct current (DC)-alternating current (AC) converting circuit, an amplifying circuit, an impedance/inductance matching circuit, at least one capacitor, at least one coil, and a communication modulation/demodulation circuit. The at least one capacitor together with the at least one coil may constitute a resonance circuit. The wireless power transmission device 100 may be implemented in a scheme defined in the wireless power consortium (WPC) standards (or Qi standards). Further, for example, the wireless power transmission device 100 may transmit power 161 as per a resonance scheme. Adopting the resonance scheme, the wireless power transmission device 100 may include, for example, a power source, a DC-AC converting circuit, an amplifying circuit, an impedance/inductance matching circuit, at least one capacitor, at least one coil, and an out-of-band short-range communication module (e.g., a Bluetooth low energy (BLE) short-range communication module). The at least one capacitor and the at least one coil may constitute a resonance circuit. The wireless power transmission device 100 may be implemented in a scheme defined in the alliance for wireless power (A4WP) standards (or air fuel alliance (AFA) standards). The wireless power transmission device 100 may include a coil that may generate a time-varying magnetic field which varies in magnitude over time if an AC current flows according to a resonance scheme or induction scheme. The process of the wireless power transmission device 100 producing a magnetic field may be represented as the wireless power transmission device 100 outputting or wirelessly transmitting the power 161. Further, the electronic device 150 may include a coil that produces an induced electromotive force by the magnetic field generated around and varying in magnitude over time. The process of the electronic device 150 producing an induced electromotive force through the coil may be represented as the power 161 being input to the electronic device 150 or the electronic device 150 wirelessly receiving the power 161.

The wireless power transmission device 100 according to an embodiment of the disclosure may communicate with the electronic device 150. For example, the wireless power transmission device 100 may communicate with the electronic device 150 as per an in-band scheme. The wireless power transmission device 100 or the electronic device 150 may vary the load (or load impedance) on the data to be transmitted, for example, using an on/off keying modulation scheme. The wireless power transmission device 100 or the electronic device 150 may determine data transmitted from its opposite device by measuring a variation in load (or load impedance), impedance, or inductance based on a variation in the current, voltage, or power across the coil. For example, the wireless power transmission device 100 may communicate with the electronic device 150 as per an out-of-band scheme. The wireless power transmission device 100 or the electronic device 150 may communicate data using a short-range communication module (e.g., a BLE communication module) provided separately from the coil or patch antennas. The frequency bands of wireless power and short-range communication module are separated from each other. For example, for the AirFuel standard, the frequency band of wireless power is 6.78 MHz and the frequency band of the short-range communication module is 2.4 GHZ.

In the disclosure, when it is stated that the "wireless power transmission device 100 or the electronic device 150" performs a particular operation, it may mean that various hardware devices, such as a processor, a coil, or a patch antenna, included in the wireless power transmission device 100 or the electronic device 150, perform the particular operation. When it is stated that the "wireless power transmission device 100 or the electronic device 150 performs a particular operation," it may also mean that the processor controls another hardware device to perform the particular operation. The phrase 'wireless power transmission device 100 or the electronic device 150 performs a particular operation" may also mean that the processor or another hardware device triggers the particular operation by executing an instruction, which is stored in a storage circuit (e.g., a memory) of the wireless power transmission device 100 or the electronic device 150.

As illustrated in FIG. 1B, a wireless power transmission device 100 may wirelessly form electrical connections with a plurality of electronic devices 150-1, 150-2, . . . , and 150-n. The plurality of electronic devices may include at least one of, e.g., a portable communication device (e.g., a smartphone), a wearable device (e.g., a watch, wireless earphones, an augmented reality/virtual reality (AR/VR) device), a portable multimedia device (e.g., a touch pad or a laptop computer), a personal digital assistant (PDA), a portable media player (PMP), a camera, a portable medical device, and a home appliance (e.g., a TV). Other various types of electronic devices may be applied.

The wireless power transmission device 100 may wirelessly transmit power 161 to the plurality of electronic devices 150-1, 150-2, . . . , and 150-n. For example, the wireless power transmission device 100 may transmit power to the plurality of electronic devices 150-1, 150-2, . . . , and 150-n through a resonance scheme. When the wireless power transmission device 100 adopts a resonance scheme, the power-transmittable/receivable distance between the wireless power transmission device 100 and the plurality of electronic devices 150-1, 150-2, . . . , and 150-n may be 1 m or less, preferably 30 cm or less. As another example, the wireless power transmission device 100 may transmit power to the plurality of electronic devices 150-1, 150-2, . . . , and 150-n through an induction scheme. When the wireless power transmission device 100 adopts the induction scheme, the power-transmittable/receivable distance between the wireless power transmission device 100 and the plurality of electronic devices 150-1, 150-2, . . . , and 150-n may be preferably 10 cm or less. According to an embodiment, at least one of the plurality of electronic devices 150-1, 150-2, . . . , and 150-n may receive power from the wireless power transmission device 100 by a resonance scheme, and at least one other electronic device 150 among the plurality of electronic devices 150-1, 150-2, . . . , and 150-n may receive power from the wireless power transmission device 100 by an induction scheme.

The processor included in the wireless power transmission device 100 may control to wirelessly transmit preset power 161 to the plurality of electronic devices 150-1, 150-2, . . . , and 150-n. For example, the power preset for the plurality of electronic devices 150-1, 150-2, . . . , and 150-n may be a level of power set to activate (e.g., wake-up) the processors included in the plurality of electronic devices 150-1, 150-2, . . . , and 150-n. The preset power 161 may be set considering various types of information for the plurality of electronic devices 150-1, 150-2, . . . , and 150-n (e.g., various types of electronic devices 150-1, 150-2, . . . , and 150-n, information for various power required for the plurality of electronic devices 150-1, 150-2, . . . , and 150-n, voltage or current information related to various power of the plurality of electronic devices 150-1, 150-2, . . . , and 150-n, information for various ratings (e.g., effective values) of the plurality of electronic devices 150-1, 150-2, . . . , and 150-n, and information for the orientations (e.g., posture information) of the plurality of electronic devices 150-1, 150-2, . . . , and 150-n). The magnitude of the power 161 transmitted to the plurality of electronic devices 150-1, 150-2, . . . , and 150-n may be the same or different for each of the plurality of electronic devices 150-1, 150-2, . . . , and 150-n.

The wireless power transmission device 100 may perform communication with the plurality of electronic devices 150-1, 150-2, . . . , and 150-n, individually, simultaneously or sequentially, selectively or independently. Each of the plurality of electronic devices 150-1, 150-2, . . . , and 150-n may transmit and receive data to/from the wireless power transmission device 100 according to either an in-band scheme or out-of-band scheme.

Here, the data may be data for controlling power reception of each of the plurality of electronic devices. Further, the data may include various pieces of information of the plurality of electronic devices 150-1, 150-2, . . . , and 150-n.

Figure 2A:
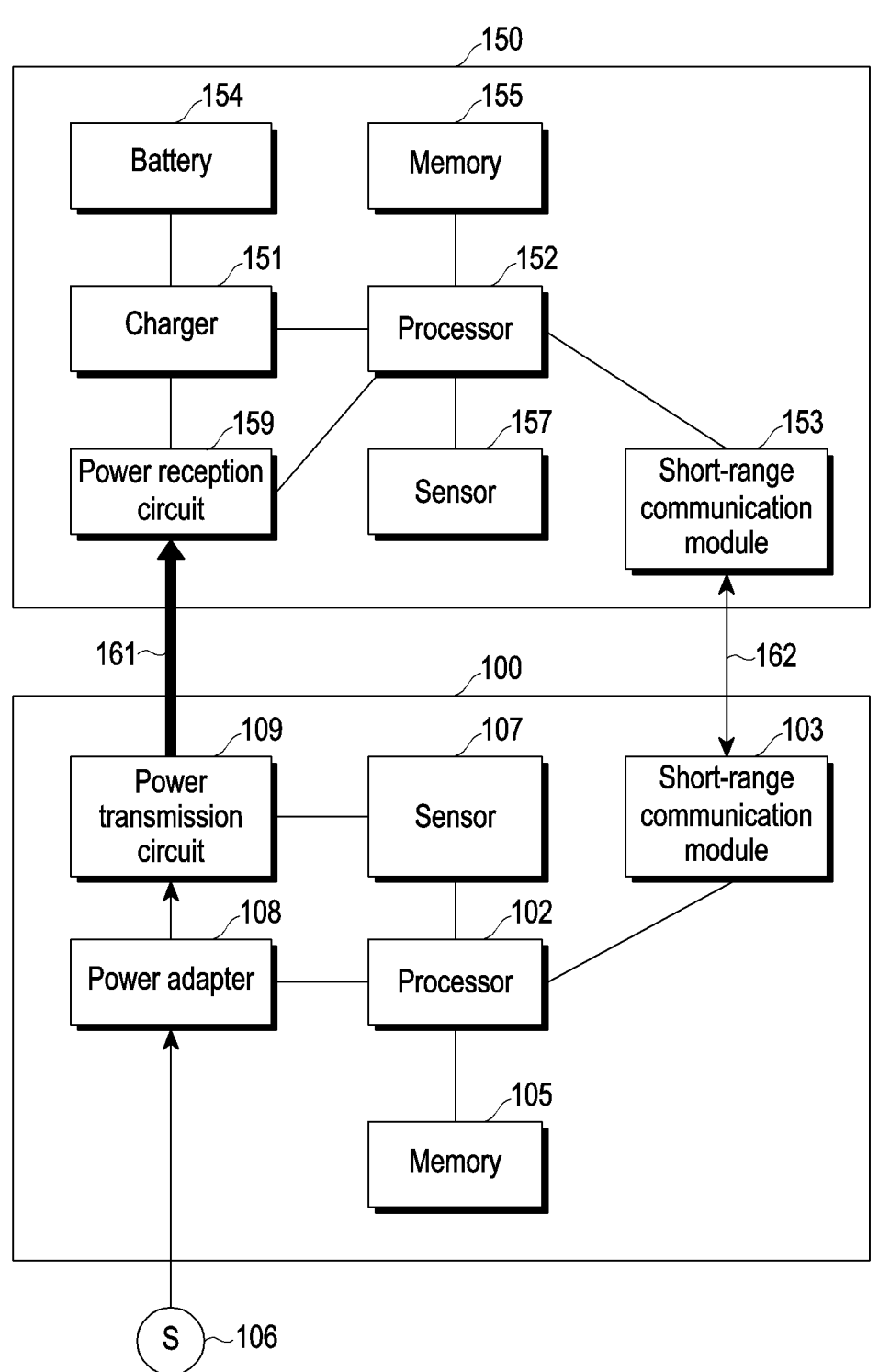
FIG. 2A illustrates a wireless power transmission device and an electronic device according to an embodiment.
Figure 2B:
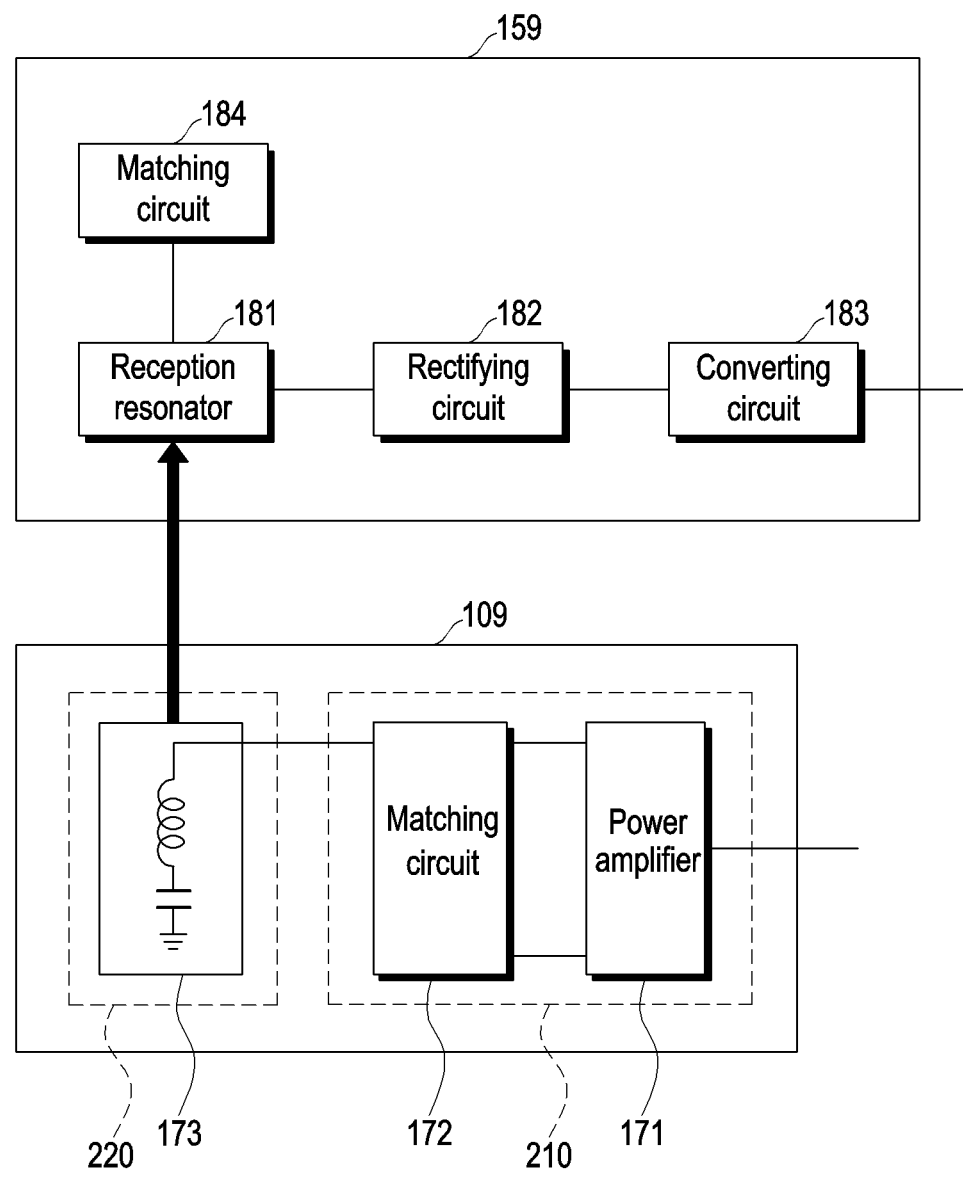
FIG. 2B is a detailed block diagram illustrating a power transmission circuit and a power reception circuit according to an embodiment.

FIG. 2A illustrates a wireless power transmission device and an electronic device according to an embodiment. FIG. 2B is a detailed block diagram illustrating a power transmission circuit and a power reception circuit according to an embodiment.

Referring to FIG. 2A, a wireless power transmission device 100 according to an embodiment may include at least one of a processor 102, a short-range communication module 103, a memory 105, a power adapter 108, or a power transmission circuit 109. An electronic device 150 according to an embodiment may include at least one of a charger 151, a processor 152, a short-range communication module 153, a battery 154, a memory 155, or a power reception circuit 159.

The power transmission circuit 109 according to an embodiment may wirelessly transmit power 161 as per at least one of an induction scheme, a resonance scheme, or an electromagnetic wave scheme. The detailed configurations of the power transmission circuit 109 and the power reception circuit 159 are described below in greater detail with reference to FIG. 2B. The processor 102 may control the overall operation of the wireless power transmission device 100. For example, the processor 102 may determine whether to transmit the power 161, control the magnitude of the power 161, or control at least one function (e.g., starts or stops charging) of the electronic device 150. The processor 102 or the processor 152 may be implemented in various circuits capable of performing calculation, such as a central processing unit (CPU) or other general-purpose processors, a microprocessor, a micro controlling unit (MCU), or a field programmable gate array (FPGA), but not limited in type thereto. The processor 102 may transmit/receive data to/from the electronic device 150 via the short-range communication module 103. The data may be used for control of wireless power transmission/reception. The short-range communication module 103 and the short-range communication module 153 may be implemented as, e.g., out-of-band short-range communication modules (e.g., Bluetooth communication modules (BT or BLE) or near-field communication (NFC) communication modules) or in-band communication load modulation communication modules. In the in-band communication scheme, the load modulation communication module may include a switch connected with, e.g., a coil of the power reception circuit 159 directly or via another element and a dummy load (e.g., a dummy resistor or dummy capacitor) connected through the switch to the coil directly or via another element. The load modulation communication module may identify information based on a variation in the voltage or current applied to the coil in the power transmission circuit 109. The power adapter 108 may receive power from the power source 106 and provide the power to the power transmission circuit 109. The power adapter 108 may be, e.g., a power interface and, according to implementation of various embodiments, the power adapter 211 may not be included in the wireless power transmission device 100.

The power reception circuit 159 according to an embodiment may wirelessly receive power as per at least one of an induction scheme, a resonance scheme, or an electromagnetic wave scheme from the power transmission circuit 109. The power reception circuit 159 may performing power processing, such as rectifying the received alternating current (AC) power into a direct current (DC) waveform, converting the voltage, or regulating the power. The charger 151 may charge the battery 154 with the regulated power (e.g., DC power) received. The charger 151 may adjust at least one of the voltage or current of the received power and transfer the adjusted power to the battery 154. The battery 154 may store power and transfer the power to other hardware components. A power management integrated circuit (PMIC) may receive power from the power reception circuit 159 and transfer the power to other hardware components, or the PMIC may receive power from the battery 154 and transfer the power to other hardware components. Further, the charger 151 may be provided included in the PMIC.

The processor 152 may control the overall operation of the electronic device 150. The memory 155 may store instructions to perform the overall operation of the electronic device 150. The memory 105 may store instructions for performing the overall operation of the wireless power transmission device 100. The memory 105 may store a lookup table for the relationship between information obtained via the short-range communication module 103 and the magnitude of power to be transmitted or equation information for the relationship between obtained information and the magnitude of power to be transmitted. The memory 105 or the memory 155 may be implemented in various types, such as a read only memory (ROM), a random access memory (RAM), or a flash memory, but not limited in type thereto.

Referring to FIG. 2B, the power transmission circuit 109 may include a power amplifier 171, a matching circuit 172 (or a matching network), and a transmission resonance circuit 173. The power amplifier 171 and the matching circuit 172 may be placed within a base housing 210, and the transmission resonance circuit 173 may be part of a resonator 220. The power amplifier 171 or the inverter circuit may convert the DC power received from the power adapter 108 into AC power. The frequency of the AC power may be set to 100 kHz to 205 kHz or 6.78 MHz according to the standard, but is not limited thereto. The matching circuit 172 may change at least one of the capacitance or the reactance of the circuit connected to the transmission resonance circuit 173 under the control of the processor 102, thereby allowing the power transmission circuit 109 and the power reception circuit 159 to be impedance-matched or inductance-matched with each other. The transmission resonance circuit 173 may include at least one coil and at least one capacitor. If AC power (or current) is applied to the transmission resonance circuit 173, a magnetic field whose magnitude changes over time may be formed from the transmission resonance circuit 173, and accordingly, power in the form of an electromagnetic field may be output or transmitted to the power reception circuit 159 of the electronic device 150. The power amplifier 171 and the matching circuit 172 may be disposed in a base housing (e.g., the base housing 310 of FIG. 3 described below) of a wireless power transmission device (e.g., the wireless power transmission device 200 of FIG. 3 described below), and the transmission resonance circuit 173 may be disposed in a resonator (e.g., the resonator 220 of FIG. 3 described below). An induced electromotive force may be generated in the reception resonator 181 of the power reception circuit 159 by a magnetic field whose magnitude changes over time formed therearound. Accordingly, the power reception circuit 159 may wirelessly receive power. The power reception circuit 159 may include a reception resonator 181, a rectifying circuit 182, a converting circuit 183, and a matching circuit 184. The reception resonator 181 may include at least one coil and at least one capacitor. The rectifying circuit 182 may rectify the AC waveform of power received. A converting circuit 183 may adjust the voltage of the power rectified and transfer the result to the PMIC or charger. The power reception circuit 159 may further include a regulator. Alternatively, the converting circuit 183 may be replaced with a regulator. The matching circuit 184 may change at least one of the capacitance or the reactance of the circuit connected to the reception resonator 181 under the control of the processor 152, thereby allowing the power transmission circuit 109 and the power reception circuit 159 to be impedance-matched or inductance-matched with each other.

Referring back to FIG. 2A, the wireless power transmission device 100 according to an embodiment of the disclosure may include at least one sensor 107.

The at least one sensor 107 may be a sensor that measures the voltage and the current of the wireless power transmission device 100. The wireless power transmission device 100 may measure the output impedance or the output inductance of the power amplifier 171 to be described below and/or the input impedance or the input inductance of the transmission resonance circuit 173 (e.g., the impedance or inductance of a signal input from the matching circuit 172 to the transmission resonance circuit 173) through the at least one sensor 107. For example, power consumption may be monitored by measuring the transmission voltage $V_{TX\_IN}$ and the transmission current $I_{TX\_IN}$ using the sensor 107, thereby detecting a change in the input impedance or the input inductance of the transmission resonance circuit 173. If the impedance change or the inductance change is detected, it may indicate whether the electronic device 150 receiving the wireless power is mounted or removed, whether a foreign substance is detected, or if there is a change in the amount of power received, among other factors. For example, while a plurality of electronic devices 150 are being charged by the wireless power transmission device 100, if any one device is moved closer so that the distance to the wireless power transmission device 100 decreases, the reception power and efficiency of another electronic device may be reduced. Considering the detected change in impedance or inductance, the processor 102 may control transmission and efficiency of wireless power to the plurality of electronic devices 150 according to a predesignated algorithm or according to a command input from the user.

The electronic device 150 according to an embodiment of the disclosure may include at least one sensor 157.

For example, the electronic device 150 may detect the movement of the electronic device 150 by itself through at least one sensor 157 (e.g., a motion sensor). The motion sensor for detecting the movement may include, for example, at least one sensor among a gyro sensor, an acceleration sensor, an angular velocity sensor, a gravity sensor, a geomagnetic sensor, and an infrared sensor. However, the type of sensor is not limited thereto. For example, the electronic device 150 may measure the voltage $V_{RECT}$ output from the rectifying circuit 182 using the at least one sensor 157. Based on the measured output voltage $V_{RECT}$, a change in the positional relationship between the electronic device 150 and the wireless power transmission device 100 (whether it gets close to or away from the resonator) may be identified. Data sensed through the sensor 157 may be provided to the processor 152, and data received by the processor 152 may be provided to the wireless power transmission device 100 through the short-range communication module 153.

According to an embodiment, the processor 102 of the wireless power transmission device 100 may control transmission and efficiency of wireless power to the plurality of electronic devices 150 by utilizing data detected from the sensor 107 and/or the sensor 157.

For example, any one of the plurality of electronic devices 150 may be disposed around the wireless power transmission device 100 while lying down. The electronic device 150 may be moved by the user and disposed closer to the wireless power transmission device 100. In this case, the processor 102 of the wireless power transmission device 100 may determine that the electronic device 150 is lying down using the data detected from the sensor 107 and/or the sensor 157, and determine that the electronic device 150 is close to the wireless power transmission device 100. Further, when a wireless power transmission device (e.g., the wireless power transmission device 300 to be described below with reference to FIG. 16) includes a plurality of resonators, e.g., a first resonator (e.g., the first resonator 320 to be described below with reference to FIG. 16) lying horizontally and a second resonator (e.g., the second resonator 330 to be described below with reference to FIG. 16) standing vertically, the processor 102 may select and use the first resonator 320 lying horizontally based on information indicating that the electronic device 150 is lying horizontally to transmit power to the electronic device (e.g., the electronic device 350 to be described below with reference to FIG. 16).

Figure 3:
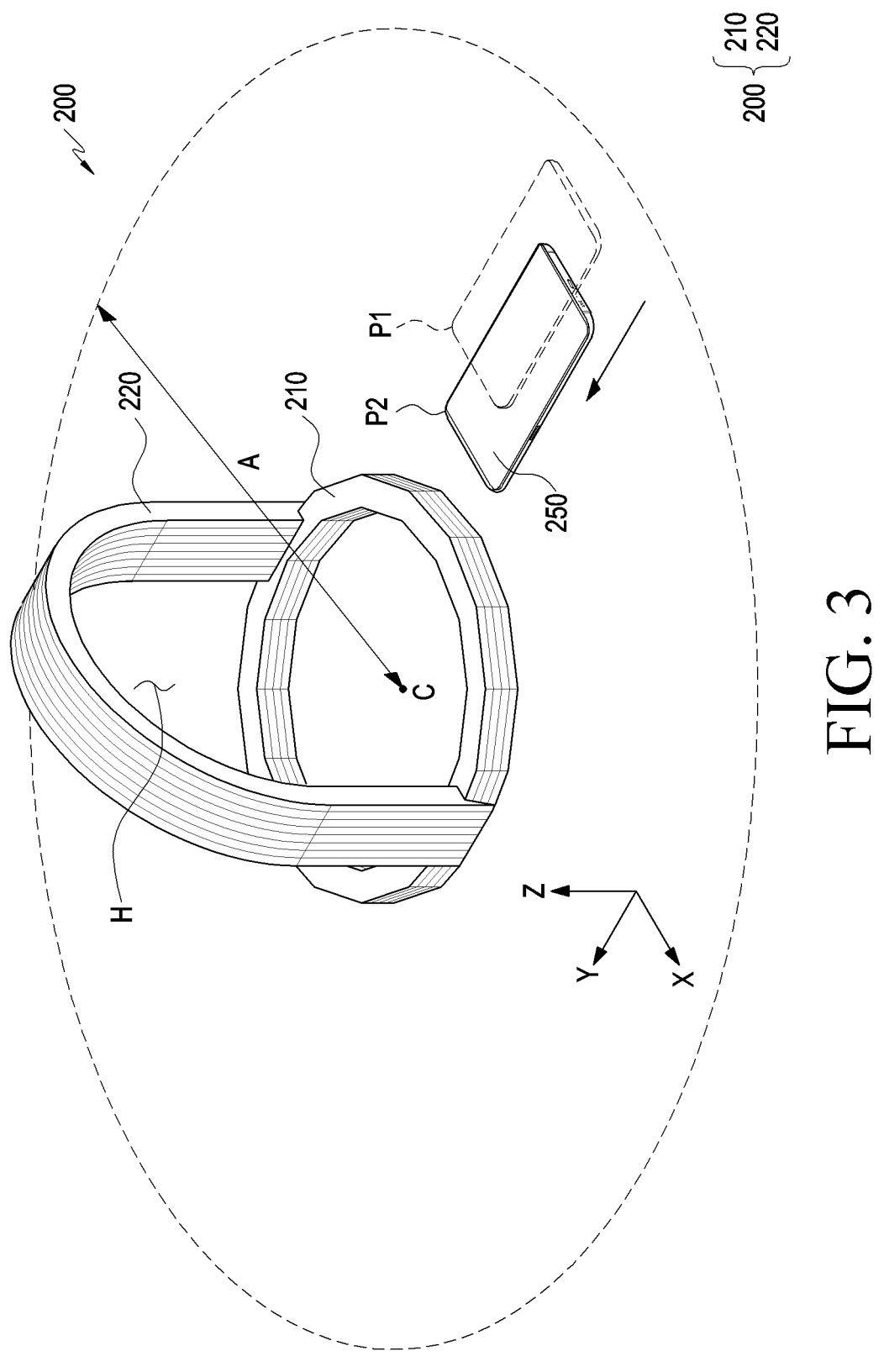
FIG. 3 is a perspective view illustrating a wireless power transmission device and at least one electronic device according to an embodiment.

FIG. 3 illustrates a wireless power transmission device and at least one electronic device according to an embodiment.

Referring to FIG. 3, a wireless power transmission device 200 (e.g., the wireless power transmission device 100 of FIGS. 1A to 2A) may include a base housing 210 and a resonator 220. Further, the electronic device 250 may be freely mounted around the wireless power transmission device 200 and, according to an embodiment, a plurality of electronic devices 250 may be provided.

According to an embodiment, the coordinate axis shown in the drawings of the disclosure may refer to a direction in which a component faces. Here, the coordinate axes may be the coordinate axes X, Y, and Z in a three-dimensional (3D) space. Referring to FIG. 3, the X-axis may be an axis parallel to the vertical width direction of the wireless power transmission device 200, and the Y-axis may be an axis parallel to the horizontal width direction of the wireless power transmission device 200. The Z-axis may be an axis parallel to the height direction of the wireless power transmission device 200. Further, when the wireless power transmission device 200 is viewed from above, the wireless power transmission device 200 may be placed on a virtual plane including the X-axis and the Y-axis. A coupling relationship between each component may be described with reference to various drawings disclosed in the disclosure and coordinate axes included therein. In describing the direction, when 'negative/positive (−/+)' is not described, it may be interpreted as including both the + direction and the − direction unless separately defined. In other words, the 'X-axis direction' may be interpreted as including both the +X direction and the −X direction, and the 'Y-axis direction' may be interpreted as including both the +Y direction and the −Y direction. In describing directions, facing in any one axis among the three axes of the orthogonal coordinate system may include facing in a direction parallel to the axis. It should be noted that the directions are so defined with respect to the Cartesian coordinate system shown in the drawings for the sake of brevity of description, and the description of these directions or components do not limit various embodiments of the disclosure. For example, the moving direction of the magnetic substance 280' described with reference to FIGS. 4 and 5, which is described below, may be defined as a direction parallel to the Y-axis. For example, in the embodiments of FIGS. 4, 9, and 14, which is described below, the plane including the X-axis and the Y-axis may form a plane parallel to the ground. However, it should be noted that this is only for convenience of description and does not limit the arrangement and/or operation range of components constituting embodiments of the present disclosure.

The base housing 210 may itself form the outer appearance of the wireless power transmission device 200, or may be a portion that forms the outer appearance of the wireless power transmission device 200 together with the resonator 220. Various electronic components (e.g., the processor 102, the short-range communication module 103, the memory 105, the power adapter 108, and the power transmission circuit 109) included in the wireless power transmission device 200 may be received in the inner space of the base housing 210. According to an embodiment, the various electronic components may be integrated and received in the wireless power transmission device 200. The shape of the base housing 210 of the wireless power transmission device 200 according to an embodiment of the disclosure is not limited to any specific embodiment. For example, in the embodiment illustrated in FIG. 3, the base housing 210 may have an overall ring shape, but is not necessarily limited thereto, and other various embodiments may be applied, such as a cylindrical cylinder and/or a polyhedron including a hexahedron.

The wireless power transmission device 200 may adopt a resonance scheme as a power transmission method for at least one electronic device 250 positioned 360 degrees around the wireless power transmission device 200. Accordingly, the wireless power transmission device 200 may include a resonator 220. The resonator 220 may include at least one coil and at least one capacitor, and various shapes may be applied thereto, but for example, the resonator 220 may be formed in a ring shape (or a loop shape) having a hollow portion H formed therein. The transmission resonance circuit 173 described above with reference to FIGS. 2A and 2B may be implemented as a combination of at least one coil and at least one capacitor included in the resonator 220.

According to an embodiment of the disclosure, the wireless power transmission device 200 may perform a power output or transmission function for the at least one electronic device 250 using the resonator 220. According to an embodiment, the resonator 220 may be supported by the base housing 210. For example, the resonator 220 may be electrically connected to the base housing 210, receiving power from the base housing 210. However, the disclosure is not necessarily limited thereto, and according to another embodiment (e.g., the embodiment of FIG. 9 to be described below), the wireless power transmission device 200 may include only the resonator 220 without the base housing 210. When the wireless power transmission device 200 includes only the resonator 220, the resonator 220 may be used in a manner to be electromagnetically coupled to another wireless power transmission device (or resonator).

According to an embodiment of the disclosure, various display methods (e.g., LED light, sound, text message, voice, etc.) may be provided to enable the user to intuitively recognize charging state monitoring information about the at least one electronic device 250 as well as the power output or transmission function using the wireless power transmission device 200. To that end, the wireless power transmission device 200 may further include at least one output device for implementing the various display methods on the base housing 210 and/or the resonator 220. Meanwhile, the charging state monitoring information here may include at least one of voltage information, current information, state of charge (SOC) information, and state of health (SOH) information about whether charging is possible or not. The power state of the electronic device may be identified through the voltage information or the current information. The power state may mean the amount of electrical energy remaining until the battery of the electronic device 250 is discharged. For example, the power state may be expressed as a percentage such as 0%, 10%, 50%, or 100%. The state of charge (SOC) may indicate whether the electronic device 250 is being charged or not. The state of health (SOH) information about the state of whether the electronic device 250 is chargeable or not may also be displayed using the wireless power transmission device 200 of the disclosure. The charging state monitoring information is not limited thereto.

The wireless power transmission device 200 may obtain position information about at least one electronic device 250 positioned at 360 degrees around the wireless power transmission device 200. To obtain position information, a phased array coil or a UWB radar sensor may be used. Alternatively, the phased array coil and the UWB radar sensor may be used together to further increase the accuracy of the position information. The charging state monitoring information may be obtained through a short-range communication module (e.g., the short-range communication module 103 of FIG. 2A of the wireless power transmission device 200). According to an embodiment, there may be provided a wireless power transmission device 200 in which when the wireless power transmission device 200 charges the plurality of electronic devices 250, it may cover all of the 360 degrees around the wireless power transmission device

200, may supply wireless power to the plurality of electronic devices 250 by one primary coil, and may perform charging even when not placed in a designated area.

A schematic flow of a power transmission method, a position information display method, and a charging state information display method for at least one electronic device 250 disposed around the wireless power transmission device 200 according to an embodiment may be as follows. First, the wireless power transmission device 200 may transmit a load detection beacon and/or a power beacon, and receive feedback of various information including voltage/power amount information from the electronic device that reacts thereto. The information received as feedback from the electronic device and the information about the electronic device obtained through the short-range communication module (e.g., the short-range communication module 103 of FIG. 2A) may be mapped. The unique ID of the at least one electronic device 250 may be identified using a short-range communication module (e.g., the short-range communication module 103 of FIG. 2A) included in the wireless power transmission device 200. Further, a pairing operation may be performed on the electronic device having the authenticated ID. The paired wireless power transmission device 200 and electronic device may transmit and receive various data related to, for example, the power state and the charging state. Further, position information about at least one electronic device 250 disposed around the wireless power transmission device 200 may be schematically obtained.

Assuming that the wireless power transmission device 200 is fixed at a certain position, power may be transmitted only if the electronic device 250 is disposed within a designated distance from the wireless power transmission device 200. For example, an effective distance for wireless power transmission between the wireless power transmission device 200 and the electronic device 250 may be 1 m or less, preferably 30 cm or less. FIG. 3 illustrates a first effective distance A as an example of the effective distance for wireless power transmission. According to the embodiment illustrated in FIG. 3, since the electronic device 250 is disposed within the effective distance (e.g., the first effective distance A) for wireless power transmission, the charging operation may be performed normally. On the contrary, if the electronic device 250 is disposed outside the effective distance, charging may not be performed or charging efficiency may be very low. For example, the effective distance may be measured from the center C of a circular area surrounded by the base housing 210, but another designated point of the wireless power transmission device 200 may be used instead of the center C. According to an embodiment, there may be provided a wireless power transmission device in a resonance scheme which is capable of charging regardless of the direction in which the electronic device 250 is placed and the position of the electronic device 250 as long as it is within a designated distance around the wireless power transmission device 200.

Meanwhile, as the electronic device 250 moves closer to the wireless power transmission device 200, the impedance or inductance of the transmission resonance circuit 173 included in the wireless power transmission device 200 may decrease due to the influence of metal included in the electronic device 250. For example, as illustrated in FIG. 3, as the electronic device 250 approaches the wireless power transmission device 200 from the first position P1 to the second position P2, the impedance or inductance of the transmission resonance circuit 173 may decrease. If the impedance or inductance of the transmission resonant circuit 173 decreases by −5% or more, the resonant frequency for the wireless power transmission device 200 may increase by about 170 kHz, for instance, from about 6.78 MHz to about 6.95 MHz, to transmit power from the wireless power transmission device 200 to the electronic device 250. Since such a change (twist) in resonant frequency may sharply reduce power charging efficiency for the electronic device 250 and cause damage to the power amplifier 171 included in the wireless power transmission device 200. Therefore, a solution to compensate for the impedance change or inductance change may be required.

Figure 4:
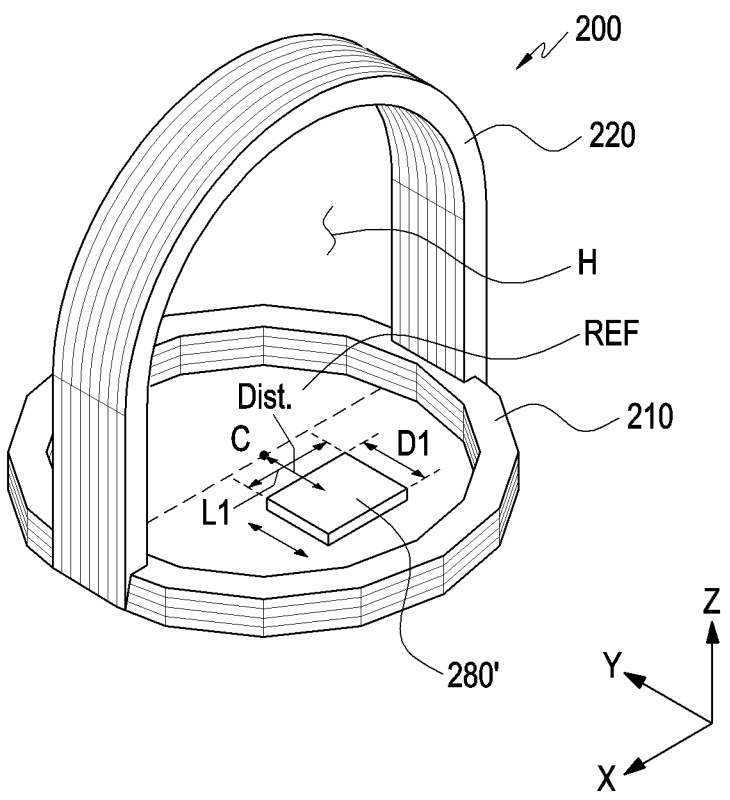
FIG. 4 is a perspective view illustrating a wireless power transmission device according to an embodiment.
Figure 5:
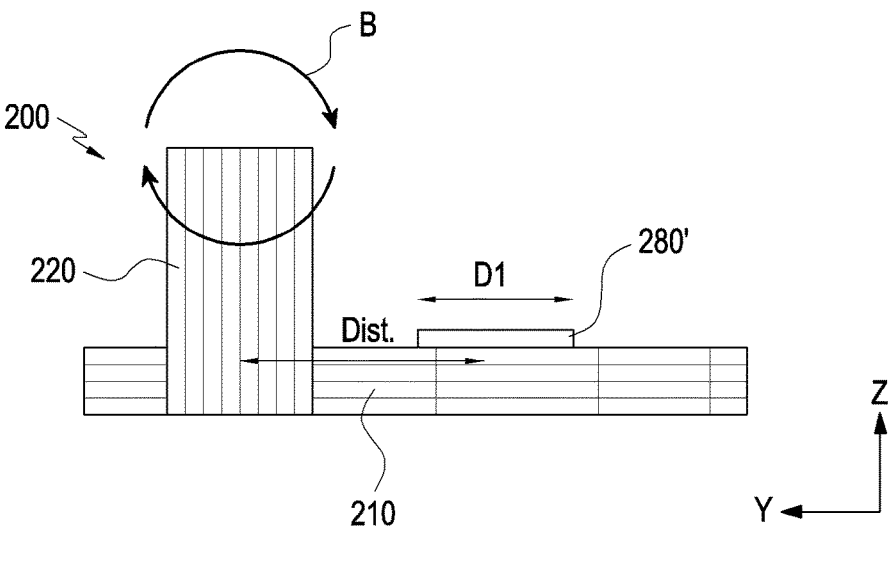
FIG. 5 is a side view illustrating a wireless power transmission device according to an embodiment.

FIG. 4 is a perspective view illustrating a wireless power transmission device according to an embodiment. FIG. 5 is a side view illustrating a wireless power transmission device according to an embodiment.

The wireless power transmission device 200 may further include a magnetic substance displacement control module (hereinafter, the magnetic substance displacement control module 280 to be described below with reference to FIG. 9) to compensate for an impedance change and a corresponding inductance change in the wireless power transmission device 200. The magnetic substance displacement control module is a component distinguished from the base housing 210 or the resonator 220 and may be provided separately from the resonator 220 to be detachable from and attachable to the resonator 220. In the disclosure, the base housing 210 and the resonator 220 may be referred to as a power transmitting unit 201 to be distinguished from the magnetic substance displacement control module.

FIGS. 4 and 5 illustrate at least a portion of the magnetic substance 280' included in the magnetic substance displacement control module, and a principle in which impedance or inductance is compensated according to an operation of the magnetic substance displacement control module may be described with reference to the embodiment of FIGS. 4 and 5.

As illustrated in FIGS. 4 and 5, at least a portion of the magnetic substance 280' may be disposed adjacent to the resonator 220 of the wireless power transmission device 200. The magnetic substance 280' may be configured to move in one direction (e.g., the Y-axis direction), adjacent to the resonator 220 of the wireless power transmission device 200, and the intensity of the magnetic field B applied around the resonator 220 may be changed by the movement of the magnetic substance 280'. Although FIG. 5 illustrates that a height of the magnetic substance 280' is greater than a height of the base housing 210, the structure and dimensions of the magnetic substance 280' are not limited to this configuration. The height of the magnetic substance 280' may be less than the height of the base housing 210.

Figure 6:
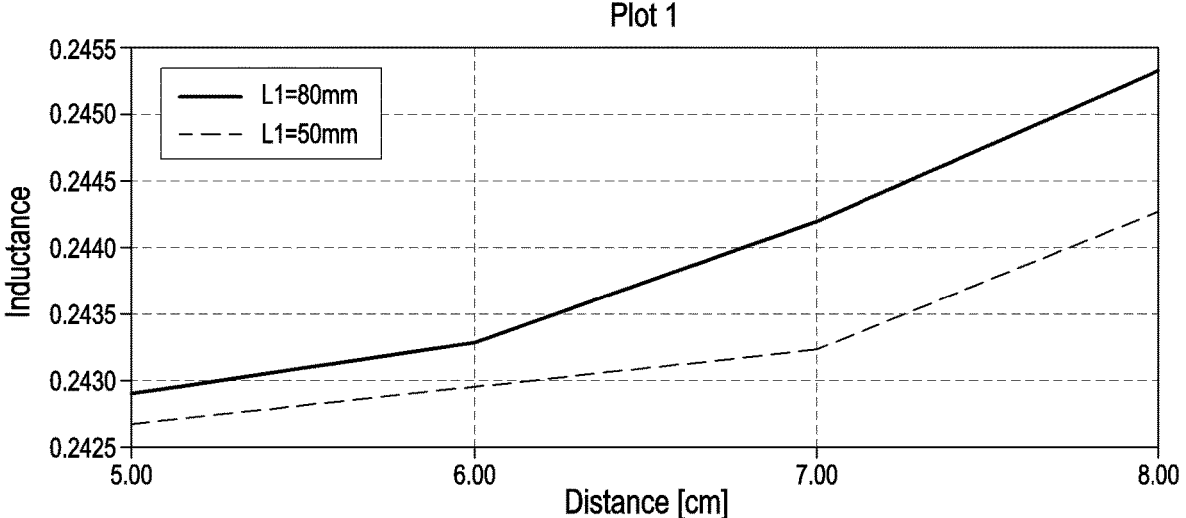
FIG. 6 is a graph illustrating a change in inductance magnitude in a transmission coil included in a resonator according to a change in the vertical width of a magnetic substance according to an embodiment.
Figure 7:
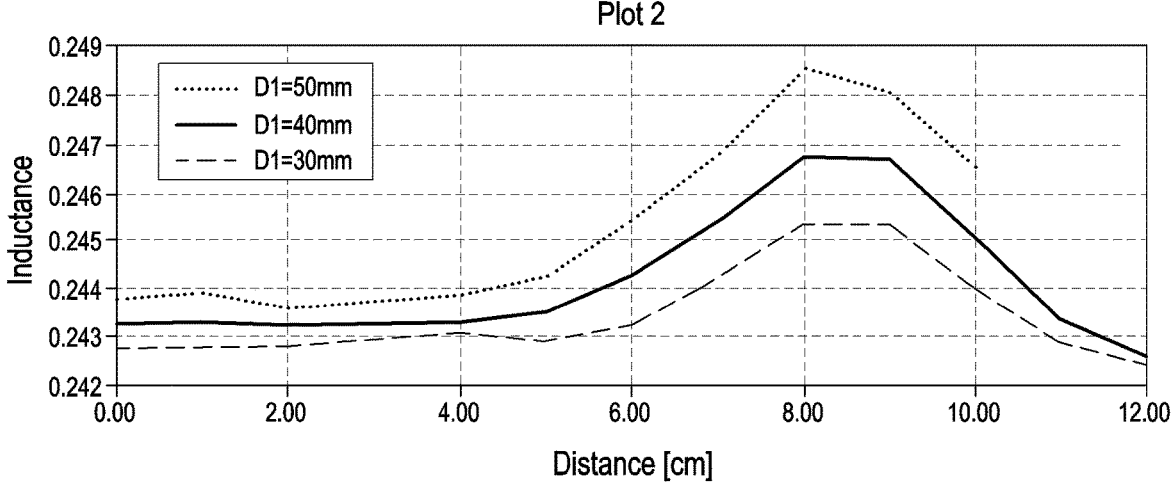
FIG. 7 is a graph illustrating a change in inductance magnitude in a transmission coil included in a resonator according to a change in the horizontal width of a magnetic substance according to an embodiment.
Figure 8:
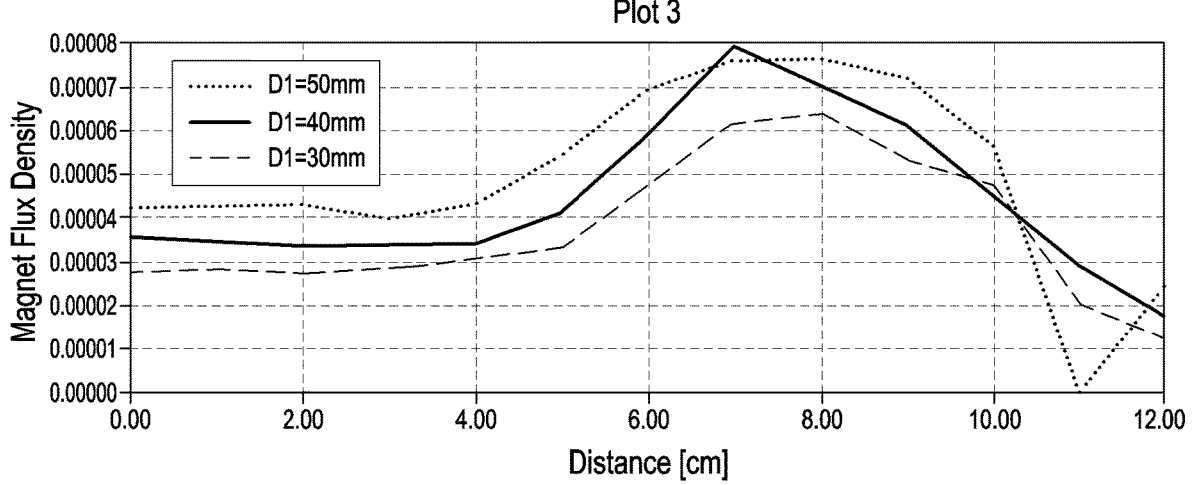
FIG. 8 is a graph illustrating magnetic flux density inside a magnetic substance according to a change in the horizontal width of a magnetic substance according to an embodiment.

FIG. 6 is a graph illustrating a change in inductance magnitude in a transmission coil included in a resonator according to a change in the vertical width (L1) of a magnetic substance according to an embodiment. FIG. 7 is a graph illustrating a change in inductance magnitude in a transmission coil included in a resonator according to a change in the horizontal width (D1) of a magnetic substance according to an embodiment. FIG. 8 is a graph illustrating magnetic flux density inside a magnetic substance according to a change in the horizontal width (D1) of a magnetic substance according to an embodiment.

Referring to FIGS. 4 to 6 together, the magnetic substance 280' may move at a position adjacent to the resonator 220 of the wireless power transmission device 200. The moving direction of the magnetic substance 280' may be parallel to the Y-axis direction. In this case, as the magnetic substance 280' moves, a distance (Dist.) between (a center of) the magnetic substance 280' and (a center C of) the resonator

220 (in a reference line REF) changes, which in turn causes the intensity of the magnetic field B to change according to the change in distance. The intensity of the magnetic field B may be proportional to the change in inductance of the resonator 220. As the magnetic substance 280' is closer to the resonator 220, the magnetic field intensity may increase and the inductance of the resonator 220 may increase. Here, the magnitude of the inductance may be related to the first width L1 of the magnetic substance 280'. The first width L1 of the magnetic substance 280' may be the width of the magnetic substance 280' measured along a direction perpendicular to the moving direction of the magnetic substance 280'. Hereinafter, the width of the magnetic substance 280' measured along a direction perpendicular to the moving direction of the magnetic substance 280' may be referred to as a 'vertical width'. For example, FIG. 6 illustrates a graph showing a change in inductance magnitude when the first width L1 of the magnetic substance 280' is 80 mm and 50 mm with the other conditions set as the same, and it may be identified that the larger the first width L1, the greater the change in in inductance magnitude according to the moving distance of the magnetic substance 280'.

Referring to FIGS. 4, 5, 7, and 8, a change in the intensity of the magnetic field B or a change in inductance as the magnetic substance 280' moves adjacent to the resonator 220 of the wireless power transmission device 200 may be related to the second width D1 of the magnetic substance 280'. The second width D1 of the magnetic substance 280' may be the width of the magnetic substance 280' measured along a direction parallel to the moving direction of the magnetic substance 280'. Hereinafter, the width of the magnetic substance 280' measured along a direction parallel to the moving direction of the magnetic substance 280' may be referred to as a 'horizontal width'. For example, FIGS. 7 and 8 illustrate a graph showing a change in inductance magnitude when the second width D1 of the magnetic substance 280' is 50 mm, 40 mm, and 30 mm with the other conditions set as the same, and the magnetic flux density inside the magnetic substance 280', and it may be identified that the larger the second width D1, the greater the change in in inductance magnitude and the change in magnetic flux density according to the moving distance of the magnetic substance 280'.

Referring to the simulation results of FIGS. 6 to 8, it may be identified that the magnetic field around the resonator 220 may be changed by moving the magnetic substance 280' having a predetermined size around the resonator 220. Further, referring to FIGS. 7 and 8 together, if the inductance is the maximum, it may be identified that the magnetic flux density inside the magnetic substance 280' increases to the maximum. There is provided a wireless power transmission device including a module disposed around a resonator, along with the resonator, to control the displacement of a magnetic substance according to the disclosure.

Figure 9:
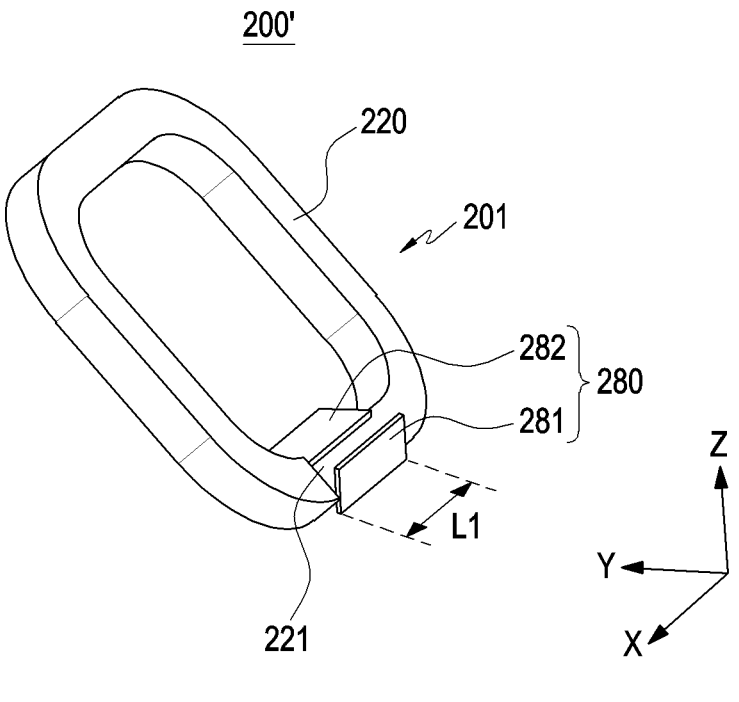
FIG. 9 is a perspective view illustrating a power transmitting unit and a magnetic substance displacement control module according to an embodiment.
Figure 10:
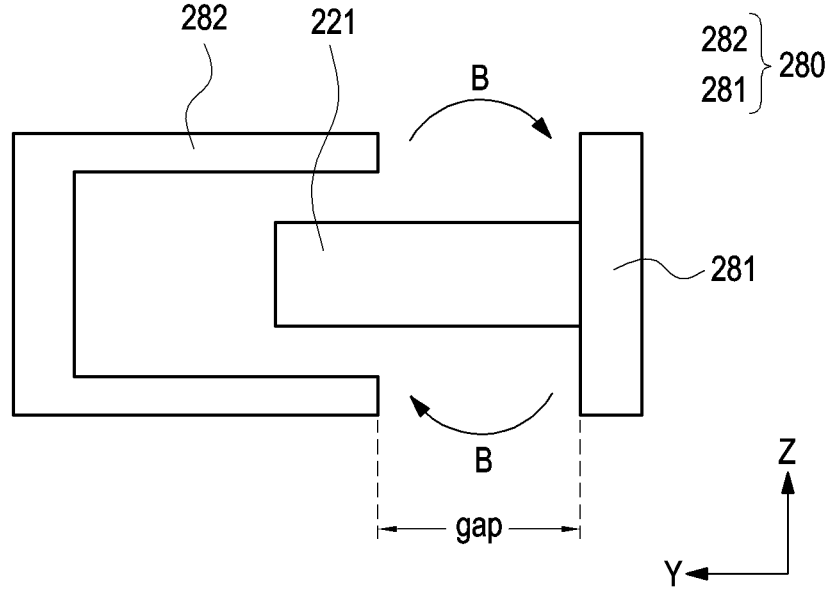
FIG. 10 is a conceptual view illustrating a coil included in a resonator and a first magnetic substance portion and a second magnetic substance portion surrounding the coil according to an embodiment.

FIG. 9 is a perspective view illustrating a resonator and a magnetic substance displacement control module according to an embodiment. FIG. 10 is a conceptual view illustrating a transmission coil included in a resonator and a first magnetic substance portion and a second magnetic substance portion surrounding the transmission coil according to an embodiment.

According to an embodiment of the disclosure, the resonator 220 may include at least one coil and at least one capacitor, and the magnetic substance displacement control module 280 may include a first magnetic substance portion 281 and a second magnetic substance portion 282. Here, the first magnetic substance portion 281 and/or the second magnetic substance portion 282 may be formed of ferrite.

In the embodiment of FIG. 9, as a wireless power transmission device, unlike the embodiment of FIG. 2A, there is illustrated a wireless power transmission device 200′ that does not include a processor 102, a short-range communication module 103, memory 105, a power adapter 108, and/or a power transmission circuit 109, but simply includes a resonator 220 including at least one coil and at least one capacitor. The wireless power transmission device 200′ according to an embodiment of the disclosure may wirelessly transmit power to the electronic device (e.g., the electronic device 150 of FIG. 2A) using the power transmitting unit 201 that does not include the processor 102, the short-range communication module 103, the memory 105, the power adapter 108, and/or the power transmission circuit 109.

According to an embodiment, the resonator 220 may be disposed perpendicular to the ground as in the embodiment illustrated in FIG. 3, but may be disposed inclined at a predetermined angle with respect to the ground as in FIG. 9 or the embodiment shown in FIG. 14 described below, or may be placed horizontal to the ground. As such, different arrangement and mounting forms of the resonator 220 may be applied according to embodiments.

Referring to FIGS. 9 and 10, in the disclosure, the first magnetic substance portion 281 and the second magnetic substance portion 282 of the magnetic substance displacement control module 280 may be disposed to surround at least a portion of the at least one coil 221. In the embodiments of FIGS. 9 and 10, it is illustrated that the first magnetic substance portion 281 has a flat shape and the second magnetic substance portion 282 has a substantially 'U' shape, but the disclosure is not necessarily limited thereto, and the shapes of the first magnetic substance portion 281 and the second magnetic substance portion 282 may be variously formed according to embodiments. The first magnetic substance portion 281 may be fixed in place, while the second magnetic substance portion 282 is configured to move laterally, to adjust a distance between the first magnetic substance portion 281 and the second magnetic substance portion 282 to either approach or move farther away from the first magnetic substance portion 281. The second magnetic substance portion 282 may act as a receptor configured to accommodate the at least one coil 221 within an area partially surrounded by the second magnetic substance portion 282a. For example, the second magnetic substance portion 282 may have a rectangular structural shape with one side open, and the side opposite the open portion may be either straight or curve. The second magnetic substance portion 282 may have a 'U' or 'C' shape. In the disclosure, the impedance and/or inductance of the at least one coil 221 included in the resonator 220 may be changed by adjusting a gap between the first magnetic substance portion 281 and the second magnetic substance portion 282 of the magnetic substance displacement control module 280. The intensity of the magnetic field may be determined by the magnetic resistance. The magnetic resistance may decrease as the distance between the first magnetic substance portion 281 and the second magnetic substance portion 282 decreases, and having a low magnetic resistance may mean having a magnetic field having a high intensity. To that end, the magnetic substance displacement control module 280 may include a modulator (hereinafter, the modulator 284 to be described below with reference to FIGS. 15A and 15B) for adjusting a gap between the first magnetic substance portion 281 and the second magnetic substance portion 282, and a driver (hereinafter, the driver 283 to be described below with reference to FIG. 13) for driving the modulator.

According to an embodiment, the magnetic substance displacement control module 280 may narrow the gap between the first magnetic substance portion 281 and the second magnetic substance portion 282 by moving the second magnetic substance portion 282 toward the first magnetic substance portion 281 using a modulator (hereinafter, the modulator 284 to be described below with reference to FIGS. 15A and 15B) and a driver (hereinafter, the driver 283 to be described below with reference to FIG. 13) for driving the modulator. In this case, as illustrated in FIG. 10, the direction in which the second magnetic substance portion 282 moves may be a direction at least partially parallel to the direction of the magnetic force line formed around the coil according to Ampère's right-hand screw rule.

According to an embodiment, as illustrated in FIG. 10, the first magnetic substance portion 281 may be fixedly connected to at least a portion of the at least one coil, and the second magnetic substance portion 282 may be connected to the modulator. Further, the second magnetic substance portion 282 moves forward and backward around the at least one coil 221 in one direction by the operation of the driver and the modulator, thereby causing a change in impedance and/or inductance. According to another embodiment, the first magnetic substance portion 281 may be connected to the modulator, and the second magnetic substance portion 282 may be fixedly connected to at least a portion of at least one coil.

Figure 11:
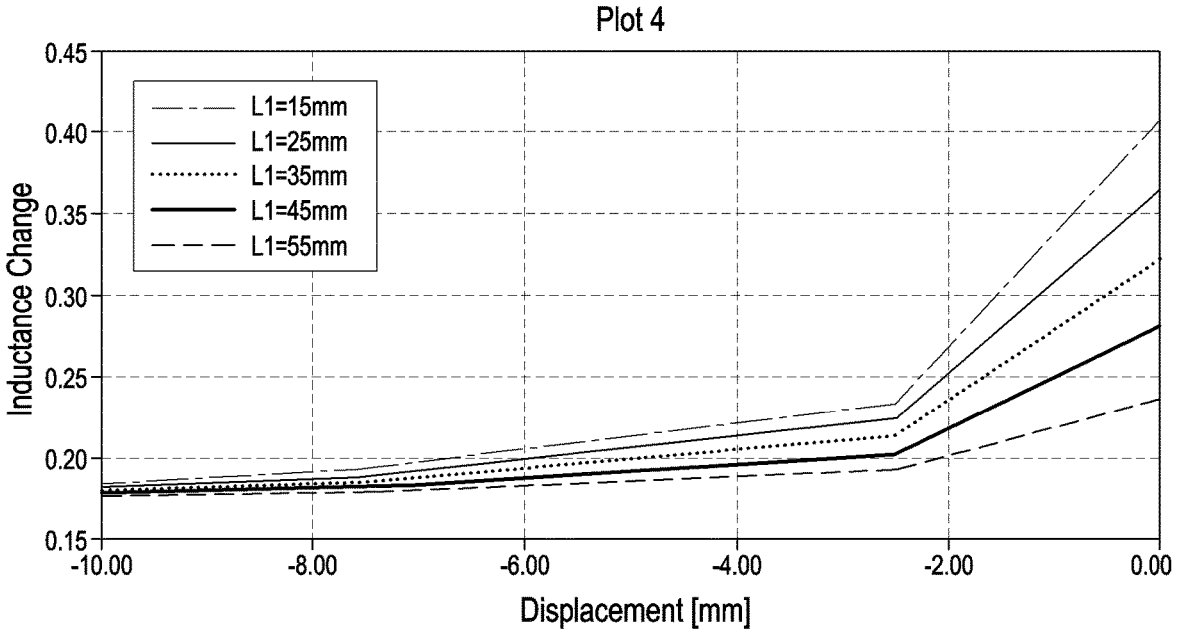
FIG. 11 is a graph illustrating an inductance change in a coil included in a resonator according to a change in the vertical width of a magnetic substance according to an embodiment.
Figure 12:
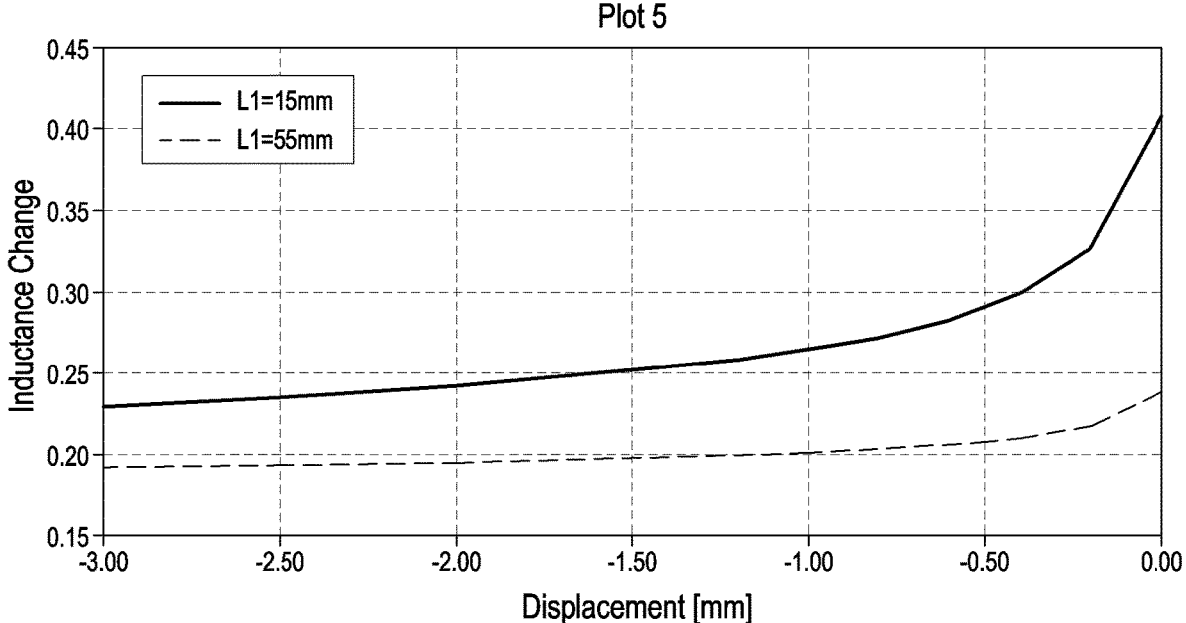
FIG. 12 is an enlarged graph illustrating a partial section of the graph of FIG. 11.

FIG. 11 is a graph illustrating an inductance change in a coil included in a resonator according to a change in the vertical width of a magnetic substance according to an embodiment. FIG. 12 is an enlarged graph illustrating a partial section of the graph of FIG. 11. The embodiment of FIGS. 11 and 12 may show a simulation result when the second magnetic substance portion 282 is laterally moved in one direction in the embodiment illustrated in FIGS. 9 and 10.

FIG. 11 may show a change ΔnH in inductance of the coil 221 included in the resonator 220 according to a movement of the magnetic substance 280′ in a state in which the vertical width of the magnetic substance (e.g., the second magnetic substance portion 282) formed of ferrite is 15 mm, 25 mm, 35 mm, 45 mm, and 55 mm when the coil size is 14 cm wide×14 cm long and the ferrite permeability is 150. In the drawings, the horizontal axis may represent the displacement of the driver (e.g., stepper motor, P_motor). The graph shown in FIG. 11 may show an inductance change value when the magnetic substance is moved by 10 mm from −10 mm to 0 mm by the modulator. FIG. 12 is a view illustrating an inductance change according to a movement of a magnetic substance (e.g., the second magnetic substance portion 282) in a state in which the vertical width of the magnetic substance is 15 mm and 55 mm, in a partial section (e.g., a section of −3 mm to 0 mm) of the graph of FIG. 11.

Referring to FIGS. 11 and 12 together, e.g., if the magnetic substance having a vertical width of 55 mm is moved by 10 mm by the modulator, it may be identified that the inductance of the coil 221 increases from about 180 nH to about 240 nH. If the inductance of the coil 221 is changed from about 180 nH to about 240 nH, the resonant frequency for power transmission may be reduced by about 150 kHz. It may be identified that, by offsetting this with the increment in the resonant frequency according to the approach of the electronic device described above with reference to FIG. 3, an inductance change capable of compensating for the influence by the approach of the electronic device may be caused even with a tiny distance movement of the magnetic substance (e.g., the second magnetic substance portion 282).

Figure 13:
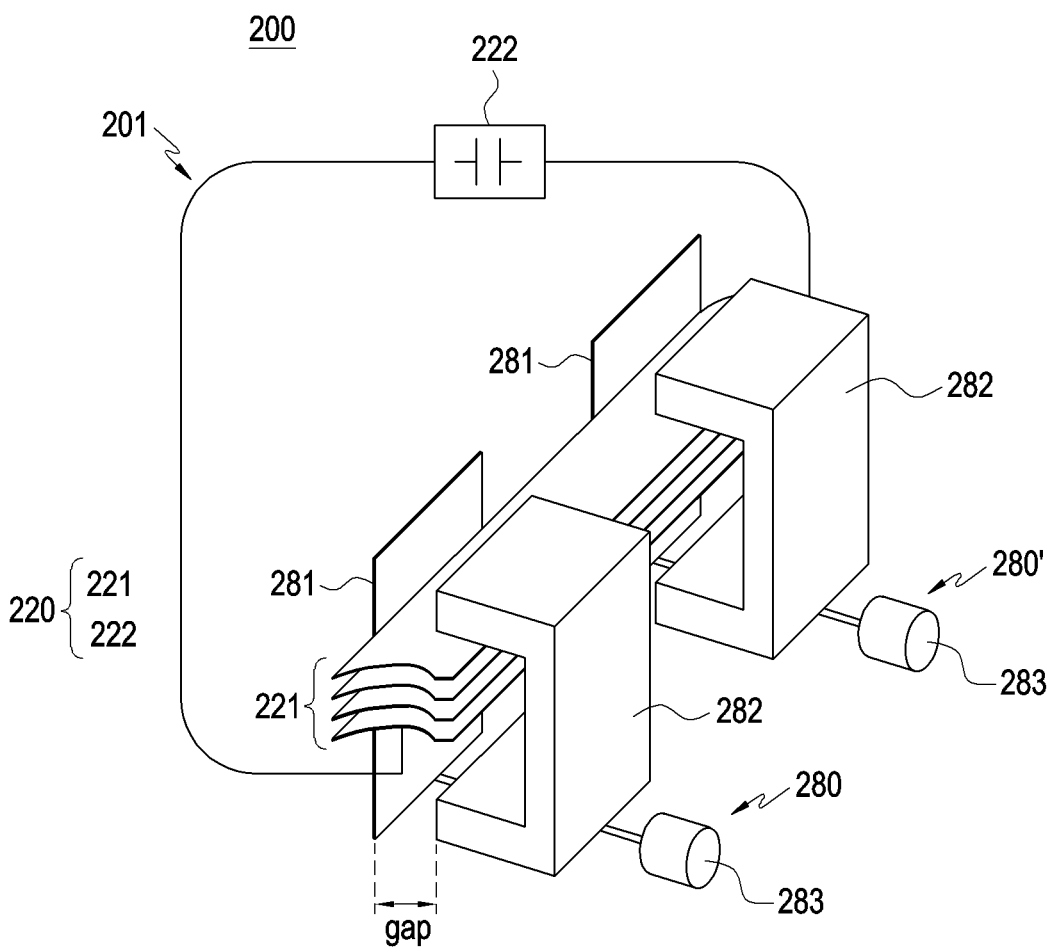
FIG. 13 is a conceptual view illustrating a wireless power transmission device including a power transmitting unit and a magnetic substance displacement control module according to an embodiment.

FIG. 13 is a conceptual view illustrating a wireless power transmission device including a resonator and a magnetic substance displacement control module according to an embodiment.

FIG. 13 illustrates another embodiment of the wireless power transmission device 200 including the resonator 220 and the magnetic substance displacement control module 280. The power transmitting unit 201 of the disclosure may include only the resonator 220 including at least one capacitor 222 together with the at least one coil 221. In this case, the at least one coil 221 and the at least one capacitor 222 may be variously applied. For example, as illustrated in FIG. 13, the at least one coil 221 may have a form in which a plurality of conductor thin films are stacked, and the first magnetic substance portion 281 and the second magnetic substance portion 282 included in the magnetic substance displacement control module 280 may have a structure surrounding the at least one coil 221.

The driver 283 included in the magnetic substance displacement control module 280 may be a driver having various types and driving methods such as a step motor or a linear actuator. For example, when a step motor is applied as the driver 283, the driver 283 may cause a change in inductance around the at least one coil 221 by moving the second magnetic substance portion 282 by a stroke (e.g., 30 mm) of a predetermined length.

According to an embodiment, as the magnetic substance displacement control module, a plurality of magnetic substance displacement control modules may be applied. For example, FIG. 13 illustrates a wireless power transmission device 200 where two magnetic substance displacement control modules 280 and 280' are applied. When a plurality of magnetic substance displacement control modules are applied as described above, a target inductance change may be implemented around at least one coil even when the driver 283 having a smaller stroke is used than when only one magnetic substance displacement control module is used. Further, by shortening the moving displacement of the magnetic substance, the speed of inductance change may be faster.

Figure 14:
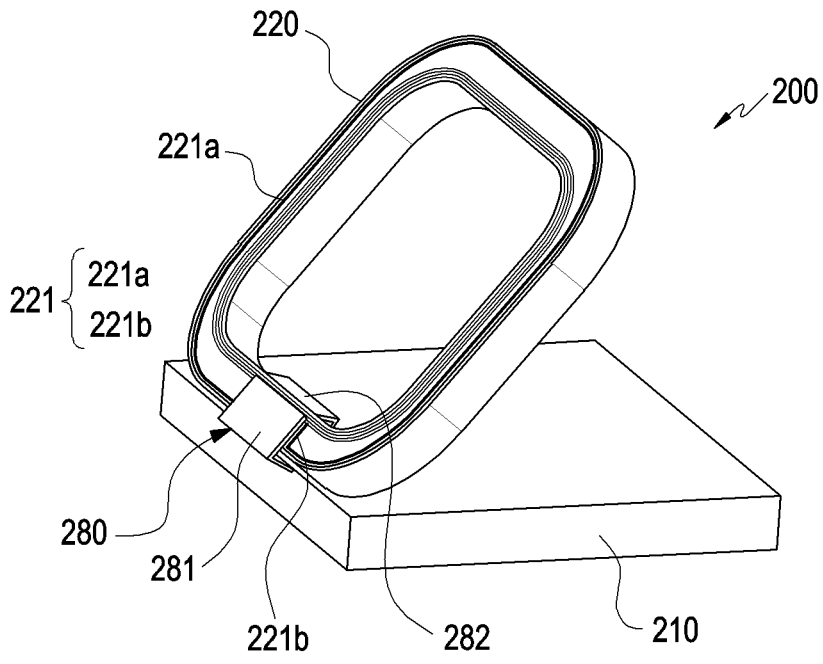
FIG. 14 is a perspective view illustrating a wireless power transmission device according to an embodiment.

FIG. 14 illustrates a wireless power transmission device according to an embodiment.

Referring to FIG. 14, a wireless power transmission device 200 (e.g., the wireless power transmission device 100 of FIGS. 1A to 2A) may include a base housing 210 and a resonator 220.

With respect to the base housing 210 and the resonator 220, descriptions of the same components as those of the embodiment of FIG. 3 may be omitted in a duplicate range. According to the embodiment illustrated in FIG. 14, the resonator 220 may be disposed while being inclined at a predetermined angle by being supported from one side of the base housing 210. According to an embodiment, an electronic device (e.g., the electronic device 250 of FIG. 3) may be mounted on the resonator 220 disposed to be inclined at a predetermined angle with respect to the base housing 210. However, the disclosure is not necessarily limited thereto, and the resonator 220 may be disposed vertically or horizontally with respect to the ground while being supported from one side of the base housing 210.

At least one coil 221 is disposed in the resonator 220. According to an embodiment, in the at least one coil 221, a single coil may be wound in a plurality of turns to form a multilayer structure. Alternatively, the at least one coil 221 may be provided with a plurality of coils each wound in one turn and stacked to form a multilayer structure. The at least one coil 221 may include a first coil 221a disposed in a first portion of the resonator 220 and a second coil 221b disposed in a second portion of the resonator 220. The first portion of the resonator 220 may be a portion not surrounded by the magnetic substance displacement control module 280, and the second portion of the resonator 220 may be a portion surrounded by the magnetic substance displacement control module 280. According to an embodiment, the first coil 221a disposed in the first portion of the resonator 220 and the second coil 221b disposed in the second portion of the resonator 220 may have the same cross-sectional shape. Alternatively, the first coil 221a disposed in the first portion of the resonator 220 and the second coil 221b disposed in the second portion of the resonator 220 may have different cross-sectional shapes.

Figure 15A:
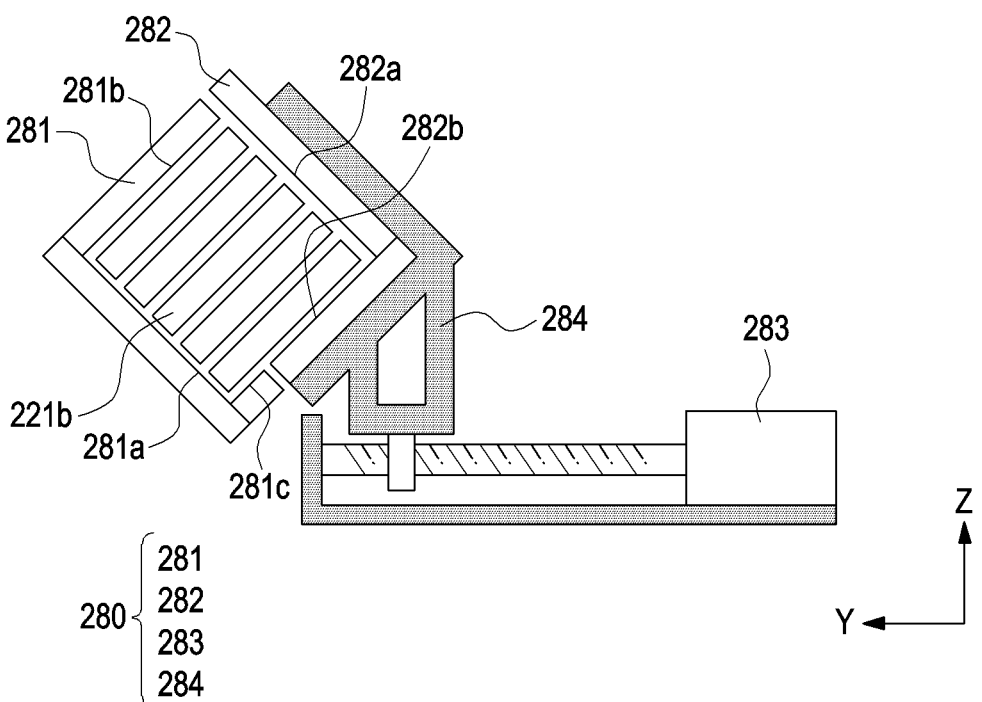
FIG. 15A is a view illustrating a magnetic substance displacement control module according to an embodiment.

FIG. 15A is a view illustrating a magnetic substance displacement control module according to an embodiment. FIG. 15B is a view illustrating a magnetic substance displacement control module according to an embodiment. FIGS. 15A and 15B illustrate a cross section of the second coil 221b disposed in the second portion of the resonator 220 surrounded by the magnetic substance displacement control module.

Figure 15B:
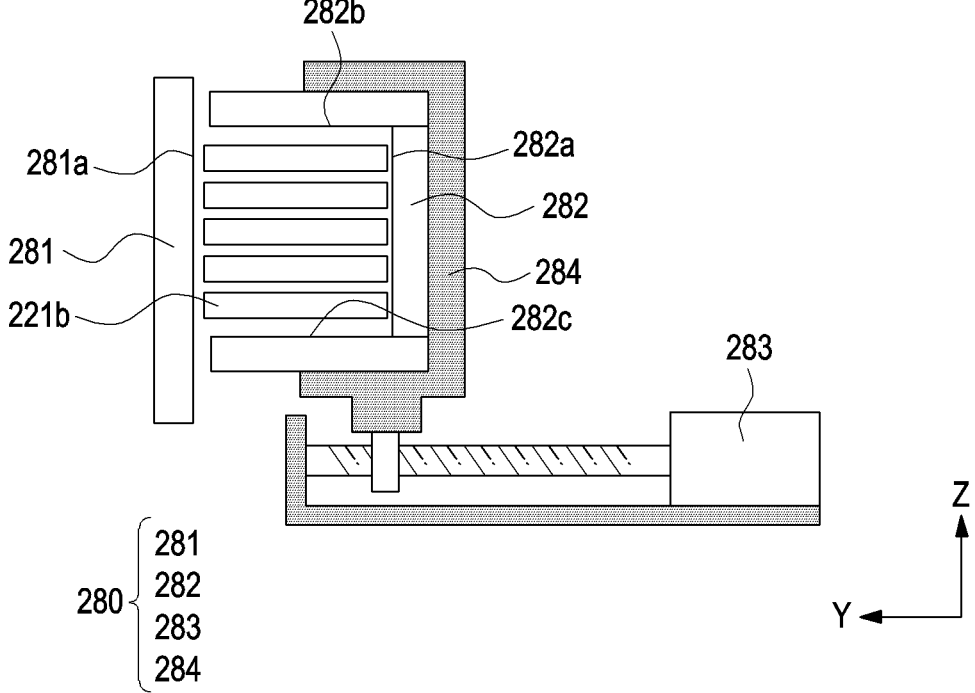
FIG. 15B is a view illustrating a magnetic substance displacement control module according to an embodiment.

Referring to FIGS. 15A and 15B together, the first magnetic substance portion 281, the second magnetic substance portion 282, the driver 283, and the modulator 284 included in the magnetic substance displacement control module 280 are not limited to the shapes illustrated in the above-described embodiments, but may have various shapes according to embodiments. The magnetic substance displacement control module 280 may include a first magnetic substance portion 281 and a second magnetic substance portion 282 surrounding the second coil 221b, and may include a modulator 284 coupled to one side of the second magnetic substance portion 282. The modulator 284 may be laterally moved in a direction parallel to the ground (e.g., the Y-axis direction) by receiving power from the driver 283, and the second magnetic substance portion 282 surrounding the second coil 221b may be moved by the movement of the modulator 284.

As illustrated in FIG. 15A, a modulator providing a support inclined by a predetermined angle with respect to the ground (a surface parallel to the surface including the X-axis and the Y-axis) may be applied as the modulator 284, or as illustrated in FIG. 15B, a modulator providing a support erected perpendicular to the ground may be applied.

The second coil 221b illustrated in FIGS. 15A and 15B may be a coil disposed in the second portion of the resonator 220 surrounded by the magnetic substance displacement control module 280.

Referring to FIGS. 14 and 15A together, in the second coil 221b according to an embodiment, the portion (the second portion) surrounded by the magnetic substance displacement control module 280 may also be disposed to be inclined with respect to the ground, corresponding to the resonator 220 being inclined at a predetermined angle with respect to the ground as a whole. In this case, in the second coil 221b, a plurality of coils may be stacked in a state of being inclined with respect to the ground, or one coil wound several times may be disposed to be inclined with respect to the ground. According to the embodiment illustrated in FIG. 15A, the second coil 221b may have the same cross-sectional shape as the first coil 221a disposed in another portion (the first portion) of the resonator 220.

Alternatively, referring to FIGS. 14 and 15B together, the second coil 221b according to an embodiment may have a shape that does not correspond to that in which the resonator 220 is inclined at a predetermined angle with respect to the ground. For example, in the second coil 221b, a plurality of coils may be stacked in parallel with the ground, or one coil wound several times may be disposed in parallel with the ground. According to an embodiment, the second coil 221b may have a cross-sectional shape different from that of the first coil 221a disposed in another portion (the first portion) of the resonator 220. The first coil 221a may be inclined at a predetermined angle with respect to the ground, and the second coil 221b may be disposed parallel to the ground. As described above, the wireless power transmission device 200 of the disclosure may form a cross-sectional shape of the second coil 221b (hereinafter, referred to as a "target coil 221b") surrounded by the magnetic substance displacement control module 280 to be different from a cross-sectional shape of the first coil 221a disposed in another portion (first portion) of the resonator 220.

According to an embodiment, one surface of the target coil 221b may face one surface of the first magnetic substance portion 281 of the magnetic substance displacement control module 280, and the other remaining surface of the target coil 221b may be formed to be covered by the second magnetic substance portion 282 having a "U" or "C" shape. In the embodiment illustrated in FIG. 15A, not only one surface of the target coil 221b faces one surface 281a of the first magnetic substance portion 281, but also another surface of the target coil 221b is surrounded by the first magnetic substance portion 281 to face the other surface 281b and/or 281c of the first magnetic substance portion 281. In this case, the two surfaces 282a and 282b of the second magnetic substance portion 282 may face the target coil 221b.

Figure 16:
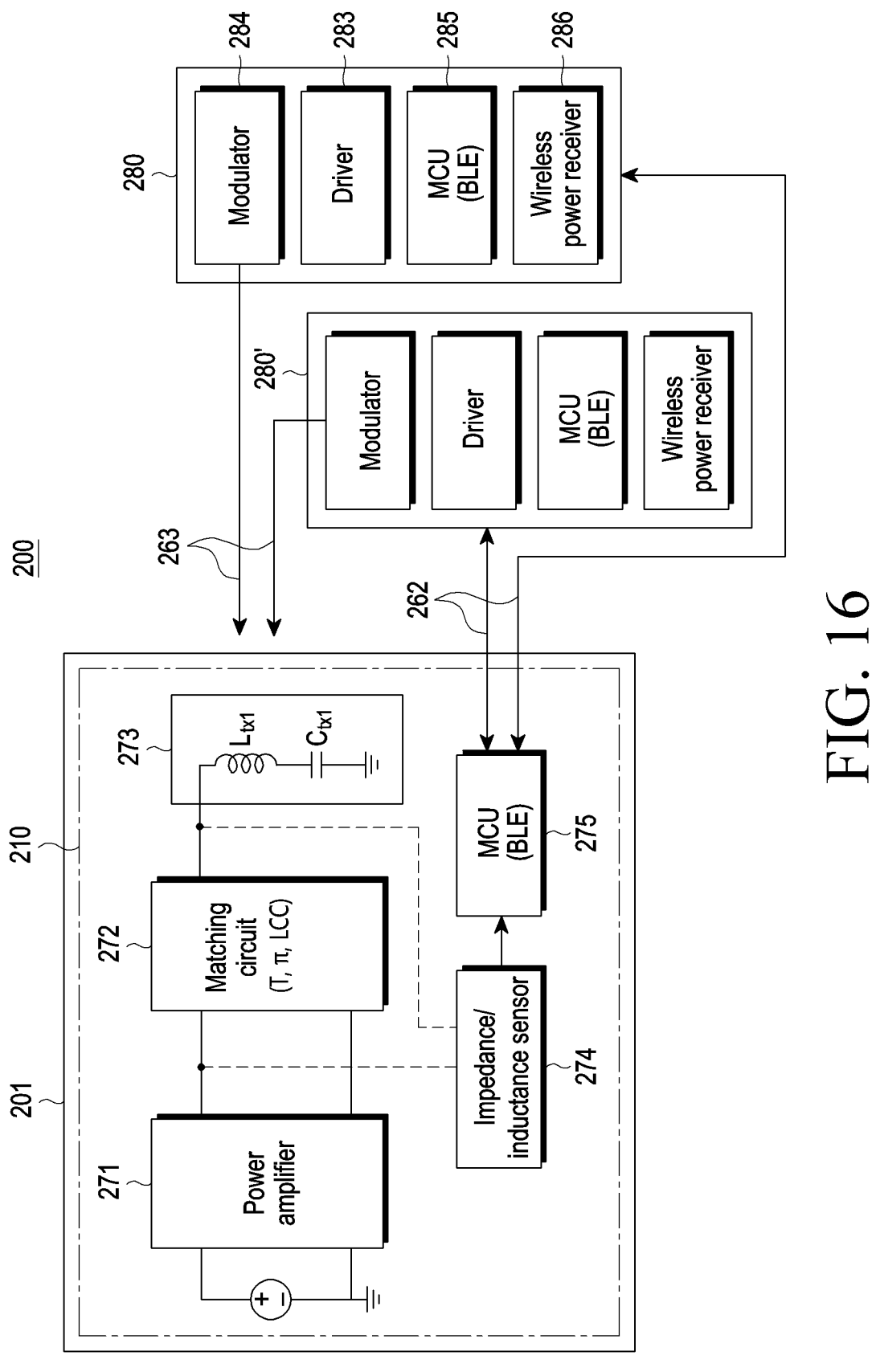
FIG. 16 is a block diagram illustrating a power transmitting unit and a magnetic substance displacement control module according to an embodiment.

In comparison, in the embodiment illustrated in FIG. 15B, one surface of the target coil 221b faces one surface 281a of the first magnetic substance portion 281, and the other surfaces of the target coil 221b are surrounded by the surfaces 282a, 282b, and 282c of the second magnetic substance portion 282. Even if the resonator 220 is disposed in a shape inclined with respect to the ground as a whole, if the arrangement of the target coil 221b and the magnetic substance displacement control module 280 is formed as illustrated in FIG. 15B, a change in inductance and/or impedance may be more effectively compensated as compared to that illustrated in FIG. 15A. If the target coil 221b is disposed in parallel with the ground, when adjusting the inductance of the coil 221 by controlling the magnetic substance displacement using the magnetic substance displacement control module 280, the area in which the second magnetic substance portion 282 moving with respect to the ground surrounds the coil 221 may be increased, thereby increasing the amount of inductance change according to the position of the magnetic substance (e.g., ferrite), and thus providing a larger amount of inductance and/or impedance compensation. If the inductance and/or impedance compensation amount is fixed, the arrangement of the target coil 221b and the magnetic substance displacement control module 280 according to the embodiment illustrated in FIG. 15B may be advantageous for downsizing as compared to the arrangement of the target coil 221b and the magnetic substance displacement control module 280 according to the embodiment illustrated in FIG. 15A. FIG. 16 is a block diagram illustrating a resonator and a magnetic substance displacement control module according to an embodiment. In describing the following embodiments of the disclosure, the same or similar, or no reference characters are given for components which may readily be appreciated from the above-described embodiments. No detailed description thereof is presented below as long as it overlaps the above description.

Referring to FIG. 16, a wireless power transmission device 200 may include a power transmitting unit 201 including a power amplifier 271 (e.g., the power amplifier 171 of FIG. 2B), a matching circuit 272 (e.g., the matching circuit 172 of FIG. 2B), and a transmission resonance circuit 273 (e.g., the transmission resonance circuit 273 of FIG. 2B). The transmission resonance circuit 273 may include at least one coil and at least one capacitor. If AC power or current is applied to the transmission resonance circuit 273, a magnetic field whose magnitude changes over time may be formed from the transmission resonance circuit 273, and accordingly, power in the form of an electromagnetic field may be output or transmitted to a power reception circuit e.g., the power reception circuit 159 of FIG. 2A of the electronic device 250. Further, the wireless power transmission device 200 may include an impedance/inductance sensor 274 and a processor 275. The wireless power transmission device 200 may measure the output impedance or the output inductance of the power amplifier 271 and/or the input impedance or the input inductance of the transmission resonance circuit 273 (e.g., the impedance or inductance of a signal input from the matching circuit 272 to the transmission resonance circuit 273), which is described below, through the impedance/inductance 274. The transmission resonance circuit 273 may be implemented as a combination of at least one coil and at least one capacitor included in the resonator 220. The impedance/inductance sensor 274 may measure a change in impedance or inductance of the resonator 220 as the electronic device 250 moves around the wireless power transmission device 200. The result value obtained by measuring the impedance change or inductance change may be input to the processor 275, and the processor 275 may control the magnetic substance displacement control module 280 or 280' to perform an operation of compensating for the impedance change. In the embodiment illustrated in FIG. 16, the power amplifier 271, the matching circuit 272, the impedance/inductance 274, and the processor 275 may be disposed in the base housing 210. FIG. 16 illustrates that the resonator 220 is also included in the base housing 210, but is not necessarily limited thereto. For example, the resonator 220 constituting the transmission resonance circuit 273 may be formed as a component physically separated and/or separated from the base housing 210.

According to an embodiment of the disclosure, the power transmitting unit 201 may perform communication 262 with the magnetic substance displacement control module 280 or 280'. For example, the power transmitting unit 201 may perform communication with the magnetic substance displacement control module 280 or 280' according to an in-band scheme or an out-of-band scheme. FIG. 16 illustrates an embodiment in which the power transmitting unit 201 performs communication with the magnetic substance displacement control module 280 or 280' through an out-of-band short-range communication module (e.g., a Bluetooth low energy (BLE) short-range communication module), but is not necessarily limited thereto. The magnetic substance displacement control module 280 or 280' may include a processor 285 (e.g., a micro controlling unit (MCU)), and may control a displacement amount of the magnetic substance displacement modulator 284 through the processor 285 based on impedance data or inductance data of the resonator 220 provided from the power transmitting unit 201. The magnetic substance displacement modulator

284 may perform an operation 263 of changing the impedance or inductance of the resonator 220 by adjusting the gap between the first magnetic substance portion 281 and the second magnetic substance portion 292 by the driver 283 driven based on a command received from the processor 285. For example, the processor 285 may receive data regarding changes in the impedance or inductance of the resonator 220 as the gap between the first magnetic substance portion 281 and the second magnetic substance portion 292 is adjusted during a preliminary adjustment stage. The processor 285 may then determine the specific gap value at which the impedance or inductance of the resonator 220 aligns with a target impedance range or a target inductance range stored in the wireless power transmission device 200. Based on the determined specific gap value, the processor 285 may generate a command to control the driver 283, directing it to adjust the actual gap between the first magnetic substance portion 281 and the second magnetic substance portion 292 during a final adjustment stage.

Referring to FIG. 16, the magnetic substance displacement control module 280 or 280' may further include a wireless power receiver 286. The magnetic substance displacement control module 280 or 280' may be provided as a component that is independently, individually, and/or physically separated from the power transmitting unit 201 through the wireless power receiver 286 to be able to change the inductance of the power transmitting unit 201.

Figure 17:
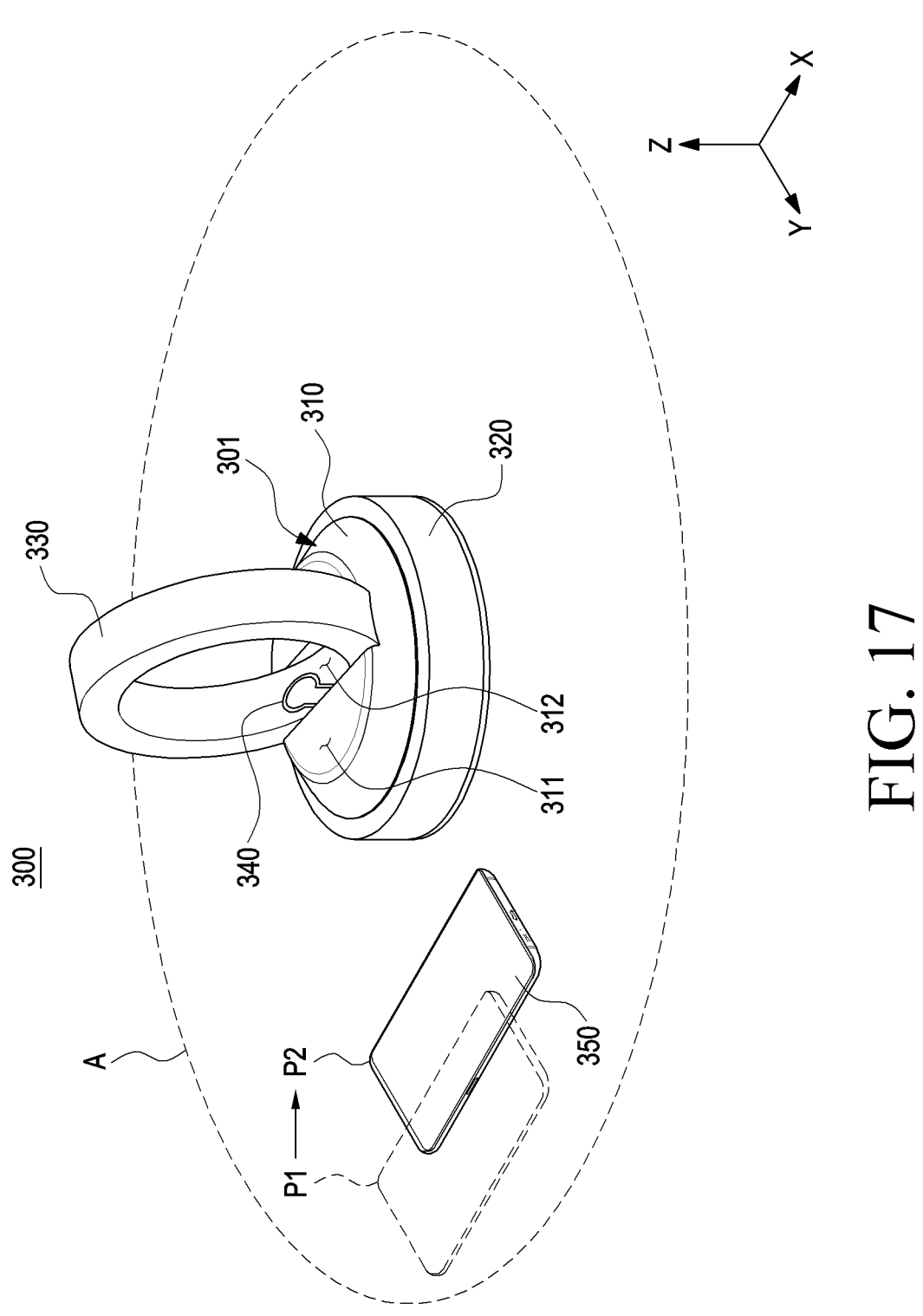
FIG. 17 is a perspective view illustrating a wireless power transmission device and an electronic device according to an embodiment.
Figure 18:
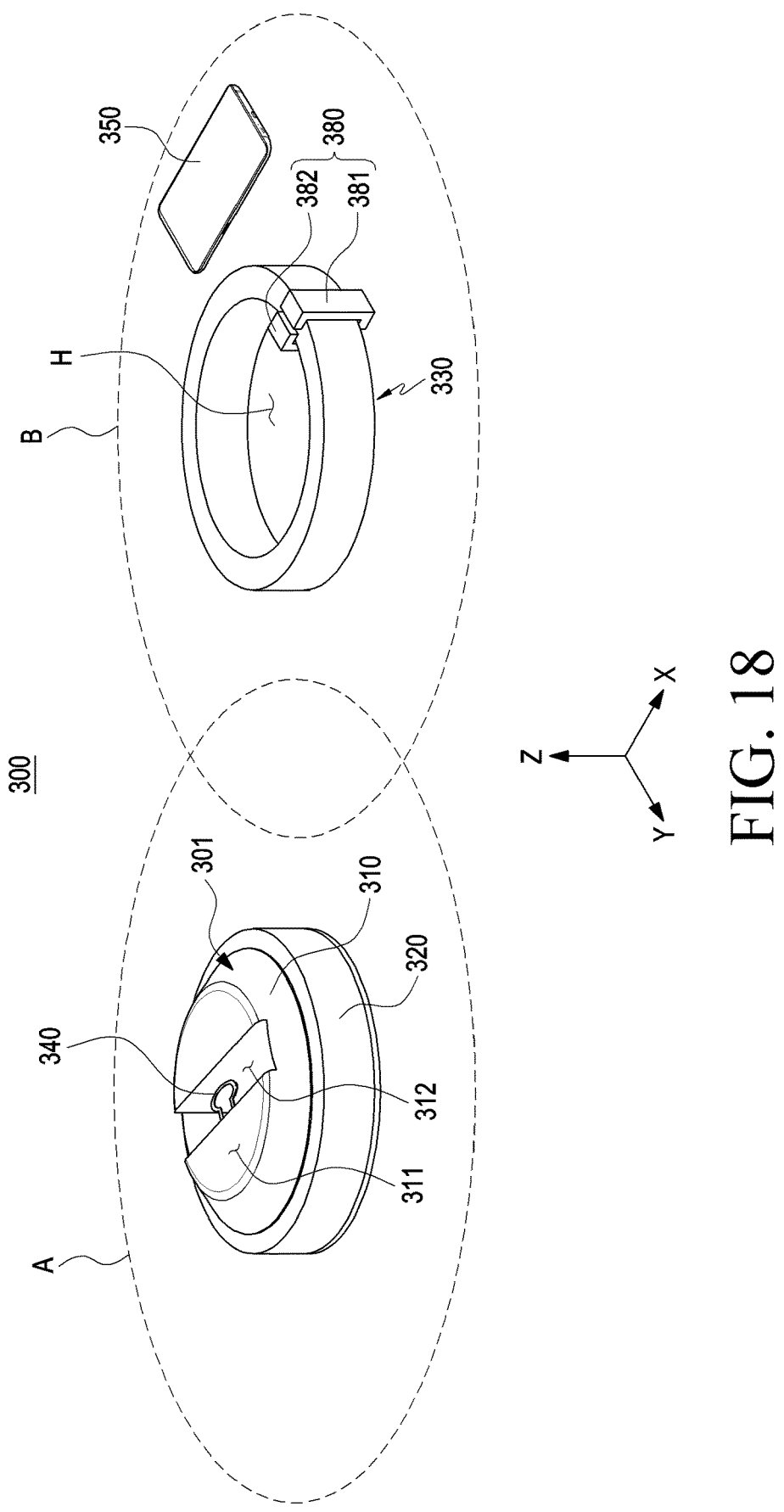
FIG. 18 is a view illustrating a usage aspect of a wireless power transmission device and a magnetic substance displacement control module according to an embodiment.

FIG. 17 is a perspective view illustrating a wireless power transmission device according to another embodiment. FIG. 18 is a view illustrating a usage aspect of a magnetic substance displacement control module in a state in which a first resonator and a second resonator are separated, according to an embodiment.

FIG. 17 may show a wireless power transmission device 300 including a detachable resonator. The detachable resonator may refer to a resonator that may be used in a state in which the resonators 320 and 330 are removed from the base housing 310.

The wireless power transmission device 300 may include resonators 320 and 330. The resonators 320 and 330 may include a first resonator 320 including at least one coil and at least one capacitor, and a second resonator 330 including at least one coil and at least one capacitor. The second resonator 330 may be physically separated from the first resonator 320.

The base housing 310 may form a structure capable of mounting the first resonator 320 and the second resonator 330. Here, the first resonator 320 may be disposed to be placed in the base housing 310 in the horizontal direction, and the second resonator 330 may be disposed to be placed in the base housing 310 in the vertical direction. For example, the first resonator 320 may be coupled to the cylindrical outer circumferential edge of the base housing 310 while lying down, and the second resonator 330 may be coupled to the groove 312 formed in the central portion of the upper surface 311 of the base housing 310 and erected. According to an embodiment, the first resonator 320 and the second resonator 330 may be formed to be compatible with each other, and thus may be disposed to cross each other. For example, in the base housing 310, the second resonator 330 may be mounted on the base housing 310 at a position where the first resonator 320 is mounted, and the first resonator 320 may be mounted at a position where the second resonator 330 is mounted. Hereinafter, for convenience of description, an embodiment in which the first resonator 320 is mounted horizontally with respect to the base housing 310 (or with respect to the ground) and the second resonator 330 is mounted vertically with respect to the base housing 310 (or with respect to the ground) is be mainly described, but it should be noted that the disclosure is not limited thereto.

According to an embodiment, the first resonator 320 mounted horizontally with respect to the base housing 310 may be mainly coupled to electronic devices placed on the ground near the wireless power transmission device 300 to transmit wireless power. Further, the second resonator 330 mounted perpendicular to the base housing 310 may be mainly coupled to electronic devices erected near the wireless power transmission device 300 or disposed to be spaced apart from the ground by a predetermined distance in the height direction of the wireless power transmission device 300 to transmit wireless power. However, the disclosure is not necessarily limited thereto, and according to an embodiment, power may be wirelessly transmitted to electronic devices erected near the wireless power transmission device 300 or disposed to be spaced apart from the ground by a predetermined distance using the first resonator 320, and wireless power may be transmitted to electronic devices placed on the ground using the second resonator 330. However, it may be more advantageous in terms of transmission efficiency to charge electronic devices placed on the ground using the first resonator 320, and to charge electronic devices erected or disposed to be spaced apart from the ground by a predetermined distance using the second resonator 330.

According to the embodiment illustrated in FIG. 17, the first resonator 320 may be formed so that an entire portion (e.g., the circumferential portion) of the first resonator 320 is exposed to the outside of the base housing 310, but the second resonator 330 may be formed so that at least a portion thereof is inserted into the base housing 310 and the remaining portion thereof is exposed to the outside. Since at least a portion of the second resonator 330 is inserted into the base housing 310, stable mounting of the second resonator 330 is possible. However, the arrangement and/or shape related to the base housing 310, the first resonator 320, and the second resonator 330 is not limited thereto but may be various.

The first resonator 320 and/or the second resonator 330 may be detachably coupled to the base housing 310. According to an embodiment, any one of the first resonator 320 or the second resonator 330 may be spaced apart from the base housing 310 of the wireless power transmission device 300 by a predetermined distance, and the wireless power charging range of the wireless power transmission device 300 may be extended using the spaced resonator as a repeater.

Referring back to FIG. 17, the wireless power transmission device 300 may include a feeding unit 340. According to an embodiment, the feeding unit 340 may be disposed in the base housing 310.

The feeding unit 340 may be electromagnetically coupled with the resonators 320 and 330, and the resonators 320 and 330 receiving power through the coupling with the feeding unit 340 may output or transmit power in the form of an electromagnetic field to the electronic device 350. For example, the feeding unit 340 may be disposed on one side of the base housing 310 to generate an electromagnetic field, and couple the generated electromagnetic field to the first resonator 320 and/or the second resonator 330 simultaneously or selectively. The feeding unit 340 may be configured as a direct/parallel connection between a coil forming a loop including at least one turn and a capacitor. According to an embodiment, the feeding unit 340 may be disposed in the base housing 310, and at least a portion of the feeding unit 340 may be exposed to the outside of the base housing 310. According to an embodiment, the feeding unit 340 may be disposed at various angles at which coupling with the resonators 320 and 330 may occur and, according to an embodiment, a plurality of feeding units 340 may be provided.

Referring to FIG. 18, any one resonator (e.g., the second resonator 330) may be used as a repeater for relaying wireless power transmission by taking advantage of the fact that the resonators 320 and 330 may be separated from the base housing 310.

According to an embodiment, while the first resonator 320 is mounted on the base housing 310, the second resonator 330 may be placed in a space around the first resonator 320. In this case, the second resonator 330 may be disposed in a direction horizontal to the ground (e.g., the embodiment of FIG. 18) or inclined at a predetermined angle with respect to the ground (e.g., the embodiment of FIG. 9) at a position spaced apart from the first resonator 320 by a predetermined distance. In this arrangement state, a wireless power charging operation for the electronic device 350 by the wireless power transmission device 300 may be implemented in such a manner that the first resonator 320 is coupled to the second resonator 330, and the second resonator 330 and the electronic device 350 are coupled. In this case, the second resonator 330 may be coupled to the first resonator 320 to extend the wireless power charging range of the wireless power transmission device 300 as a repeater.

In contrast to the role of the second resonator 330 relaying power transmission in the embodiments of FIGS. 17 and 18, the first resonator 320 is coupled to the base housing 310 to control the overall wireless charging operation. Thus, the first resonator 320 and the base housing 310 may be collectively referred to as a power transmitting unit 301. The first resonator 320 may be coupled to electronic devices placed on a floor near the wireless power transmission device 300 to transmit wireless power. In this case, the effective distance for wireless power transmission by the first resonator 320 of the wireless power transmission device 300 may be limited to the first effective distance A. According to various embodiments, the second resonator 330 may be disposed at a position spaced apart from the first resonator 320 by a predetermined distance, thereby increasing the effective distance for wireless power transmission by the second effective distance B by the second resonator 330. For example, since the electronic device 350 illustrated in FIG. 18 is positioned outside the first effective distance A of the first resonator 320 but within the second effective distance B of the second resonator 330, power may be received from the wireless power transmission device 300.

Even when the second resonator 330 is mounted perpendicular to the wireless power transmission device 300 and the first resonator 320 is disposed at a position spaced apart from the wireless power transmission device 300 by a predetermined distance, the effective distance for wireless power transmission may be increased.

According to various embodiments of the disclosure, the wireless power transmission device 300 may include a base housing 310 and a detachable resonator (e.g., the first resonator 320 and/or the second resonator 330) separable from the base housing 310. According to the wireless charging environment desired by the user, the detachable resonator (e.g., the first resonator 320 and/or the second resonator 330) may be coupled to the base housing 310 or disposed at any position other than the base housing 310 to perform the wireless power charging function. Further, an effective distance for wireless power transmission may be extended using an appropriate arrangement of a detachable resonator (e.g., the first resonator 320 and/or the second resonator 330).

As described above with reference to FIG. 3, a change in impedance or inductance of the resonator 220 may occur when the electronic device 250 approaches the resonator 220 coupled to the base housing 210, but as illustrated in FIG. 18, a change in impedance or inductance of the resonator (e.g., the second resonator 330) may also occur when the electronic device 350 approaches a resonator (e.g., the second resonator 330) not coupled to the base housing 310. For example, when the electronic device 350 moves around the second resonator 330, the impedance change or inductance change of the second resonator 330 according to the movement of the electronic device 350 may appear, coupled to the first resonator 320. The first resonator 320 may include at least one sensor 374 (e.g., an impedance sensor or an inductance sensor) for sensing such an impedance change or an inductance change. According to an embodiment, although not illustrated in the drawings, the second resonator 330 may further include at least one sensor 374 for sensing an impedance change and/or an inductance change or a power amplifier 371 on its own. In order to compensate for the impedance change or the inductance change, the wireless power transmission device 300 according to an embodiment of the disclosure may further include a magnetic substance displacement control module 380. Hereinafter, a configuration of a power transmission circuit and a power reception circuit for compensating for an impedance change or an inductance change is described in detail with reference to the embodiments of FIGS. 19 and 20.

Figure 19:
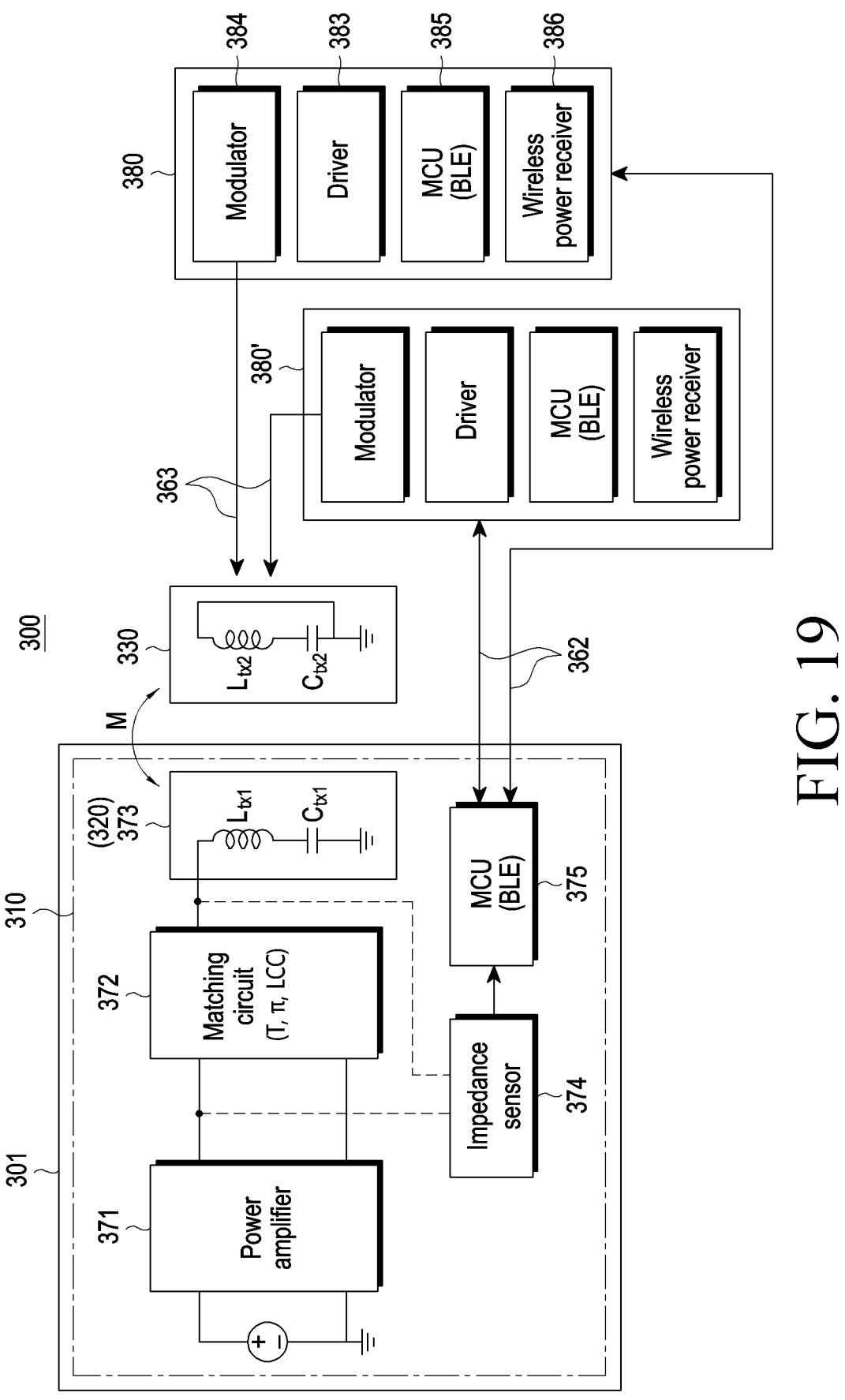
FIG. 19 is a block diagram illustrating a wireless power transmission device and a magnetic substance displacement control module according to the embodiment of FIG. 17.
Figure 20:
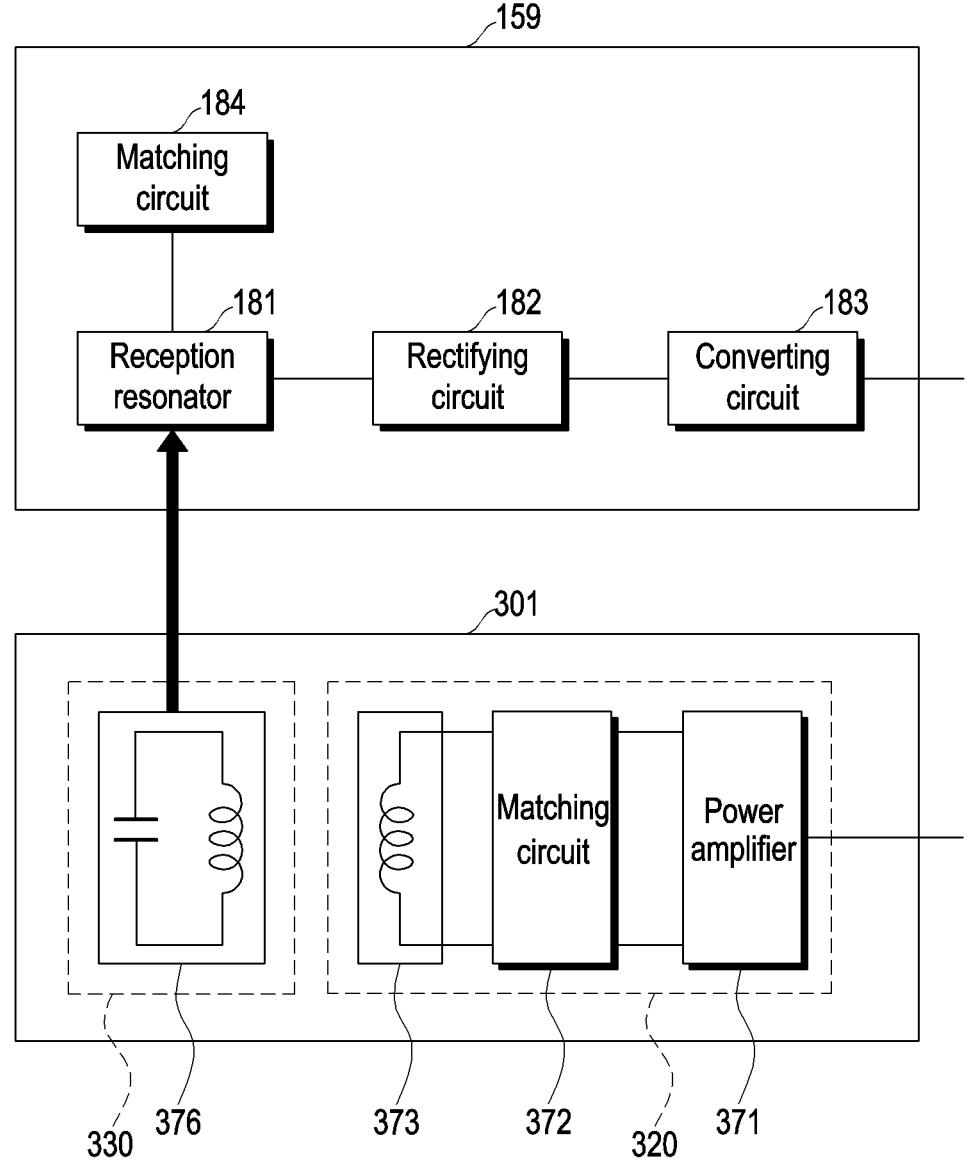
FIG. 20 is a detailed block diagram illustrating a power transmission circuit and a power reception circuit according to the embodiment of FIG. 17.

FIG. 19 is a block diagram illustrating a wireless power transmission device and a magnetic substance displacement control module according to the embodiment of FIG. 17. FIG. 20 is a detailed block diagram illustrating a power transmission circuit and a power reception circuit according to the embodiment of FIG. 17.

Referring to FIGS. 19 and 20 together, a wireless power transmission device 300 may include a power transmitting unit 301 including a power amplifier 371 (e.g., the power amplifier 171 of FIG. 2B), a matching circuit 372 (e.g., the matching circuit 172 of FIG. 2B), and a first transmission resonance circuit 373 (e.g., the transmission resonance circuit 173 of FIG. 2B). The first transmission resonance circuit 373 may be implemented as the first resonator 320 as including at least one coil and at least one capacitor. The wireless power transmission device 300 may further include a second transmission resonance circuit. The second transmission resonance circuit may also be implemented as the second resonator 330 as including at least one coil and at least one capacitor. If AC power (or current) is applied to the first transmission resonance circuit 373, a magnetic field whose magnitude changes over time may be formed from the first transmission resonance circuit 373, the second transmission resonance circuit may be coupled, and power in the form of an electromagnetic field may be transmitted to a power reception circuit (e.g., the power reception circuit 159 of FIG. 2A) of the electronic device 350 by the magnetic field whose magnitude changes over time around the second transmission resonance circuit. Further, the wireless power transmission device 300 may include at least one sensor 374 and a processor 375. The wireless power transmission device 300 may measure the output impedance or the output inductance of the power amplifier 371 to be described below and/or the input impedance or the input inductance of the first transmission resonance circuit 373 (e.g., the impedance or inductance of a signal input from the matching circuit 372 to the first transmission resonance circuit 373) through the at least one sensor 374. The at least one sensor 374 may measure a change in impedance or inductance of the first resonator 320 as the electronic device 350 moves around the wireless power transmission device 300. This result value may be input to the processor 375, and the processor 375 may allow the magnetic substance displacement control module 380 or 380' to perform an operation of compensating for the impedance change or inductance change. In the embodiment illustrated in FIG. 19, the power amplifier 371, the matching circuit 372, the at least one sensor 374, and the processor 375 may be disposed in the base housing 310. FIG. 19 illustrates that the first resonator 320 is also included in the base housing 310, but is not necessarily limited thereto. For example, the first resonator 320 constituting the first transmission resonance circuit 373 may be formed as a component physically distinguished and/or separated from the base housing 310. Further, although FIG. 19 illustrates that the power amplifier 371 and the at least one sensor 374 are disposed in the base housing 310, the first resonator 320 and the resonator (e.g., the second resonator 330) separable from the base housing 310 may further include at least one sensor and an amplifier for measuring an impedance change or an inductance change on its own.

The power transmitting unit 301 according to an embodiment of the disclosure may perform communication 362 with the magnetic substance displacement control module 380 or 380'. For example, the wireless power transmission device 300 may communicate with the magnetic substance displacement control module 380 or 380' according to an in-band scheme or an out-of-band scheme. FIG. 18 illustrates an embodiment in which the power transmitting unit 301 performs communication with the magnetic substance displacement control module 380 or 380' through an out-of-band short-range communication module (e.g., a Bluetooth low energy (BLE) short-range communication module), but is not necessarily limited thereto. The short-range communication module may be a communication interface implemented using any one or any combination of a digital modem, a radio frequency (RF) modem, an antenna circuit, a WiFi chip, BLE transceiver, and related software and/or firmware. The magnetic substance displacement control module 380 or 380' may include a processor 385 (e.g., a micro controlling unit (MCU)), and may control a displacement amount of the magnetic substance displacement modulator 384 through the processor 385 based on impedance data or inductance data provided from the power transmitting unit 301. The magnetic substance displacement modulator 384 may perform an operation 363 for changing the impedance or inductance of the second resonator 330 by adjusting a gap between the first magnetic substance portion 381 and the second magnetic substance portion 382 by the driver 383 driven based on a command received from the processor 385.

Referring to FIG. 19, the magnetic substance displacement control module 380 or 380' may further include a wireless power receiver 386.

In summarizing the above description, the disclosure may provide a wireless power transmission device 200 or 300 capable of compensating for an impedance change or an inductance change by including a magnetic substance displacement control module 280 or 380. In this case, the magnetic substance displacement control module 280 or 380 may be provided as a component that is independently, individually, and/or physically separated from the power transmitting unit 201 or 301 of the wireless power transmission device 200 or 300 to be able to change the inductance of the power transmitting unit 201.

An electronic device according to various embodiments of the disclosure may be various types of devices. The electronic devices may include, for example, a portable communication device (e.g., a smart phone), a computer device, a portable multimedia device, a portable medical device, a camera, a wearable device, or a home appliance. According to an embodiment of the present invention, the electronic device is not limited to the above-listed embodiments.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. In the disclosure, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

In the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program products may be traded as commodities between sellers and buyers. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

According to an embodiment of the disclosure, there may be provided a wireless power transmission device (e.g., the wireless power transmission device 200 of FIG. 13) comprising a resonator and a magnetic substance displacement control module, wherein the resonator (e.g., the resonator 220 of FIG. 13) includes at least one coil (e.g., the at least one coil 221 of FIG. 13) and at least one capacitor (e.g., the at least one capacitor 222 of FIG. 13), wherein the magnetic substance displacement control module (e.g., the magnetic substance displacement control module 280 of FIG. 13) includes a first magnetic substance portion (e.g., the first magnetic substance portion 281 of FIG. 13) and a second magnetic substance portion (e.g., the second magnetic substance portion 282 of FIG. 13), a modulator (e.g., the modulator 284 of FIGS. 15A and 15B) configured to adjust a gap between the first magnetic substance portion and the second magnetic substance portion, and a driver (e.g., the driver 283 of FIG. 13) configured to drive the modulator, and wherein the first magnetic substance portion and the second magnetic substance portion of the magnetic substance displacement control module are disposed to surround at least a portion of the at least one coil.

According to an embodiment, the wireless power transmission device may further comprise a base housing (e.g., the base housing 210 of FIG. 14) supporting at least a portion of the resonator.

According to an embodiment, the wireless power transmission device may further comprise a power amplifier (e.g., the power amplifier 271 of FIG. 16), a matching circuit (e.g., the matching circuit 272 of FIG. 16), and a transmission resonance circuit (e.g., the transmission resonance circuit 273 of FIG. 16).

According to an embodiment, the wireless power transmission device may further comprise at least one sensor (e.g., an impedance/inductance sensor 274 of FIG. 16) configured to measure an output impedance or an output inductance of the power amplifier and/or an input impedance or an input inductance of the transmission resonance circuit.

According to an embodiment, the resonator may be a ring-shaped resonator having a hollow portion formed therein.

According to an embodiment, in the magnetic substance displacement control module, the first magnetic substance portion may be fixedly connected to at least a portion of the at least one coil, and the second magnetic substance portion may be connected to the modulator.

According to an embodiment, the resonator may include a first resonator (e.g., the first resonator 320 of FIGS. 17 and 18) including at least one coil and at least one capacitor and a second resonator (e.g., the second resonator 330 of FIGS. 17 and 18) including at least one coil and at least one capacitor.

According to an embodiment, the second resonator may be configured to be coupled in a state of being spaced apart from the first resonator to transmit power.

According to an embodiment, the first resonator may further include a base housing supporting the first resonator, and the second resonator may be detachably provided from the base housing.

According to an embodiment, the wireless power transmission device may comprise a plurality of magnetic substance displacement control modules (e.g., the magnetic substance displacement control modules 280 and 280' of FIG. 13).

According to an embodiment, the magnetic substance displacement control module may be configured to adjust a gap by moving the first magnetic substance portion with respect to the second magnetic substance portion or the second magnetic substance portion with respect to the first magnetic substance portion in a direction at least partially parallel to a direction of a magnetic force line formed around the at least one coil, and.

According to an embodiment, a coil portion (e.g., the second coil 221b of FIG. 14) surrounded by the magnetic substance displacement control module may have a different cross-sectional shape than a coil portion (e.g., the first coil 221a of FIG. 14) not surrounded by the magnetic substance displacement control module.

According to an embodiment, at least one of the first magnetic substance portion and the second magnetic substance portion may have a "U" or "C" shape.

According to an embodiment, the magnetic substance displacement control module may be provided to be detachable from the resonator.

According to an embodiment, the magnetic substance displacement control module may further include a short-range communication module and a processor (e.g., the processor 285 of FIG. 16), and the processor may be configured to control a displacement amount of a magnetic substance displacement modulator based on impedance data or inductance data of the resonator.

According to an embodiment of the disclosure, there may be provided a magnetic substance displacement control module (e.g., the magnetic substance displacement control module 280 of FIG. 13) for an impedance change or an inductance change of a resonator (e.g., the resonator 220 of FIG. 13) comprising a first magnetic substance portion (e.g., the first magnetic substance portion 281 of FIG. 13), a second magnetic substance portion (e.g., the second magnetic substance portion 282 of FIG. 13) couplable to the first magnetic substance portion, a modulator (e.g., the modulator 284 of FIGS. 15A and 15B) configured to adjust a gap between the first magnetic substance portion and the second magnetic substance portion, and a driver (e.g., the driver 283 of FIG. 13) configured to drive the modulator.

According to an embodiment, the first magnetic substance portion and the second magnetic substance portion may include a ferrite material.

According to an embodiment, at least one of the first magnetic substance portion and the second magnetic substance portion may have a "U" or "C" shape.

According to an embodiment, the magnetic substance displacement control module may be provided to be detachable from the resonator.

According to an embodiment, the magnetic substance displacement control module may further include a short-range communication module and a processor (e.g., the processor 285 of FIG. 16), and the processor may be configured to control a displacement amount of a magnetic substance displacement modulator based on impedance data or inductance data of the resonator.

The foregoing exemplary embodiments are merely exemplary and are not to be construed as limiting. The present teaching can be readily applied to other types of apparatuses. Also, the description of the exemplary embodiments is intended to be illustrative, and not to limit the scope of the claims, and many alternatives, modifications, and variations will be apparent to those skilled in the art.

What is claimed is:

1. A wireless power transmission device comprising:
   a resonator comprising at least one coil and at least one capacitor; and
   a magnetic substance displacement control module comprising:
      a first magnetic substance portion and a second magnetic substance portion;
      a modulator configured to adjust a gap between the first magnetic substance portion and the second magnetic substance portion; and
      a driver configured to drive the modulator; and
   wherein the first magnetic substance portion and the second magnetic substance portion of the magnetic substance displacement control module are disposed to surround at least a portion of the at least one coil.

2. The wireless power transmission device of claim 1, further comprising a base housing that supports at least a portion of the resonator.

3. The wireless power transmission device of claim 1, further comprising a power amplifier, a matching circuit, and a transmission resonance circuit.

4. The wireless power transmission device of claim 1, further comprising a power amplifier, a transmission resonance circuit, and at least one sensor,
   wherein the at least one sensor is configured to measure at least one of:
      an output impedance of the power amplifier;
      an output inductance of the power amplifier;
      an input impedance of the transmission resonance circuit; and
      an input inductance of the transmission resonance circuit.

5. The wireless power transmission device of claim 1, wherein the resonator is a ring-shaped resonator having a hollow portion formed therein.

6. The wireless power transmission device of claim 1, wherein in the magnetic substance displacement control module, the first magnetic substance portion is fixedly connected to at least a portion of the at least one coil, and the second magnetic substance portion is connected to the modulator.

7. The wireless power transmission device of claim 1, wherein the resonator comprises a first resonator and a second resonator, and
   wherein each the first resonator and the second resonator comprises at least one coil and at least one capacitor.

8. The wireless power transmission device of claim 7, wherein the second resonator is configured to be coupled to the first resonator while being spaced apart from the first resonator to transmit power.

9. The wireless power transmission device of claim 7, wherein the first resonator further comprises a base housing that supports the first resonator, and wherein the second resonator is detachably provided from the base housing.

10. The wireless power transmission device of claim 1, wherein the magnetic substance displacement control module is configured to adjust the gap between the first magnetic substance portion and the second magnetic substance portion by moving the first magnetic substance portion with respect to the second magnetic substance portion or by moving the second magnetic substance portion with respect to the first magnetic substance portion in a direction that is at least partially parallel to a magnetic force line generated around the at least one coil.

11. The wireless power transmission device of claim 1, wherein at least one of the first magnetic substance portion and the second magnetic substance portion has a "U" shape.

12. The wireless power transmission device of claim 1, wherein the magnetic substance displacement control module is provided to be detachable from the resonator.

13. The wireless power transmission device of claim 1, wherein the magnetic substance displacement control module further includes a communication interface and a processor, and
   wherein the processor is configured to control a displacement amount of the modulator based on impedance data and/or inductance data of the resonator provided through the communication interface.

14. A magnetic substance displacement control module comprising:
   a first magnetic substance portion;
   a second magnetic substance portion that is physically separated from and configured to be coupled to the first magnetic substance portion;
   a modulator configured to adjust a gap between the first magnetic substance portion and the second magnetic substance portion; and
   a driver configured to drive the modulator.

15. The magnetic substance displacement control module of claim 14, wherein the first magnetic substance portion and the second magnetic substance portion comprise a ferrite material.

16. A wireless charger comprising:
   a resonator comprising at least one coil and at least one capacitor;
   a first magnetic substance portion positioned at a fixed location;
   a second magnetic substance portion physically separated from the first magnetic substance portion and configured to move laterally toward or away from the first magnetic substance portion;

a driver configured to cause the second magnetic substance portion to move relative to the first magnetic substance portion; and a processor configured to control the driver to adjust a gap between the first magnetic substance portion and the second magnetic substance portion based on a measured inductance of the resonator.

17. The wireless charger of claim 16, wherein the second magnetic substance portion has a rectangular structural shape with one side open, and another side of the second magnetic substance portion opposite the open side is either straight or curved, and wherein the second magnetic substance portion is configured to accommodate the at least one coil within an hollow area partially surrounded by the second magnetic substance portion.

18. The wireless charger of claim 17, wherein an area of the at least one coil surrounded by the second magnetic substance portion increases as the second magnetic substance portion moves closer to the first magnetic substance portion.

19. A magnetic substance displacement control module for an impedance change or an inductance change of a resonator comprising:

a first magnetic substance portion, a second magnetic substance portion couplable to the first magnetic substance portion, and a modulator configured to adjust a gap between the first magnetic substance portion and the second magnetic substance portion, and a driver configured to drive the modulator.

20. The magnetic substance displacement control module of claim 19, wherein the first magnetic substance portion and the second magnetic substance portion include a ferrite material.

* * * * *